United States Patent
Lee et al.

(10) Patent No.: US 9,736,851 B2
(45) Date of Patent: Aug. 15, 2017

(54) WIRELESS EQUIPMENT FOR TRANSMITTING UPLINK SIGNAL THROUGH REDUCED TRANSMISSION RESOURCE BLOCK AND POWER, AND ENODEB

(71) Applicant: LG ELECTRONICS INC., Seoul (KR)

(72) Inventors: Sangwook Lee, Anyang-si (KR); Yoonoh Yang, Anyang-si (KR); Suhwan Lim, Anyang-si (KR); Manyoung Jung, Anyang-si (KR); Jinyup Hwang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 14/389,644

(22) PCT Filed: May 8, 2013

(86) PCT No.: PCT/KR2013/004031
§ 371 (c)(1),
(2) Date: Sep. 30, 2014

(87) PCT Pub. No.: WO2013/172585
PCT Pub. Date: Nov. 21, 2013

(65) Prior Publication Data
US 2015/0071203 A1    Mar. 12, 2015

Related U.S. Application Data

(60) Provisional application No. 61/647,524, filed on May 16, 2012, provisional application No. 61/809,886, filed on Apr. 9, 2013.

(51) Int. Cl.
*H04W 72/08* (2009.01)
*H04L 5/00* (2006.01)

(52) U.S. Cl.
CPC .......... *H04W 72/08* (2013.01); *H04L 5/0044* (2013.01); *H04L 5/0066* (2013.01); *H04L 5/0007* (2013.01)

(58) Field of Classification Search
CPC ... H04L 5/0066; H04L 5/0007; H04L 5/0053; H04L 27/26; H04L 5/001; H04L 5/14;
(Continued)

(56) References Cited

U.S. PATENT DOCUMENTS

2007/0173276 A1   7/2007   Love et al.
2010/0255868 A1   10/2010  Lee et al.
(Continued)

FOREIGN PATENT DOCUMENTS

CN   101371455   2/2009
JP   2009-545243  12/2009
(Continued)

OTHER PUBLICATIONS

3GPP TS36.101 V.8.3.0 Release 8, "E-UTRA User Equipment (UE) radio transmission and reception", Sep. 2008.*
(Continued)

*Primary Examiner* — Ian N Moore
*Assistant Examiner* — Brian T Le
(74) *Attorney, Agent, or Firm* — Lee Hong Degerman Kang Waimey

(57) ABSTRACT

According to one embodiment of the present invention, provided is a wireless equipment for transmitting an uplink signal through a reduced transmission resource block (RB) in a wireless communication system. The wireless equipment can comprise: a processor; and a radio frequency (RF) unit for transmitting an uplink signal under control of the processor. When the RF unit is set to a predetermined channel bandwidth and a predetermined frequency range and must satisfy a predetermined maximum allowed value
(Continued)

of spurious radiation to protect another frequency range, the uplink signal can be transmitted according to a predetermined maximum number of RBs instead of a total number of RBs for the predetermined channel bandwidth.

11 Claims, 21 Drawing Sheets

(58) Field of Classification Search
CPC .. H04L 27/2614; H04L 5/0044; H04J 11/003; H04W 52/24; H04W 52/367; H04W 72/0413; H04W 72/0446; H04W 74/004; H04W 52/146; H04W 16/14; H04W 72/0453; H04W 72/0473; H04W 52/325; H04W 72/08

See application file for complete search history.

(56) References Cited

U.S. PATENT DOCUMENTS

| | | |
|---|---|---|
| 2011/0274092 A1 | 11/2011 | Liu et al. |
| 2012/0075989 A1 | 3/2012 | Roessel et al. |

FOREIGN PATENT DOCUMENTS

| | | |
|---|---|---|
| JP | 2010-279017 | 12/2010 |
| KR | 10-2008-0094002 | 10/2008 |
| KR | 10-2009-0115217 | 11/2009 |
| KR | 10-2011-0110700 | 10/2011 |
| WO | 2012/002728 | 1/2012 |
| WO | 2012/008816 | 1/2012 |
| WO | 2012/036378 | 3/2012 |

OTHER PUBLICATIONS

3rd Generation Partnership Project (3GPP), "Technical Specification Group Radio Access Network; Evolved Universal Terrestrial Radio Access (E-UTRA); User Equipment (UE) radio transmission and reception (Release 10)," 3GPP TS 36.101 V10.6.0, Mar. 2012, 312 pages.
Japan Patent Office Application Serial No. 2015-512568, Office Action dated Nov. 24, 2015, 3 pages.
European Patent Office Application Serial No. 13790088.2, Search Report dated Dec. 18, 2015, 8 pages.
Intel, "Spurious Emission Simulation Results," 3GPP TSG-RAN WG4 Meeting #63, R4-123231, May 2012, 4 pages.
LG Electronics, "Coexistence Study for LTE 900MHz," 3GPP TSG RAN WG4 #63, R4-122508, May 2012, 3 pages.
Korean Intellectual Property Office Application Serial No. 10-2014-7027046, Office Action dated Feb. 2, 2016, 6 pages.
Qualcomm Incorporated, "Band 5 and Band 8 coexistence," 3GPP TSG-RAN WG4 #59AH, R4-113792, Jun. 2011, 3 pages.
Korean Intellectual Property Office Application Serial No. 10-2014-7027046, Office Action dated Aug. 18, 2015, 6 pages.
PCT International Application No. PCT/KR2013/004031, Written Opinion of the International Searching Authority dated Aug. 14, 2013, 1 page.
The State Intellectual Property Office of the People's Republic of China Application Serial No. 201380022319.8, Office Action dated Dec. 28, 2016, 11 pages.
3rd Generation Partnership Project; Technical Specification Group Radio Access Network; Evolved Universal Terrestrial Radio Access (E-UTRA); User Equipment (UE) radio transmission and reception (Release 9), 3GPP TS 36.101 V9.3.0, Mar. 2010, 172 pages.

* cited by examiner

FIG. 19
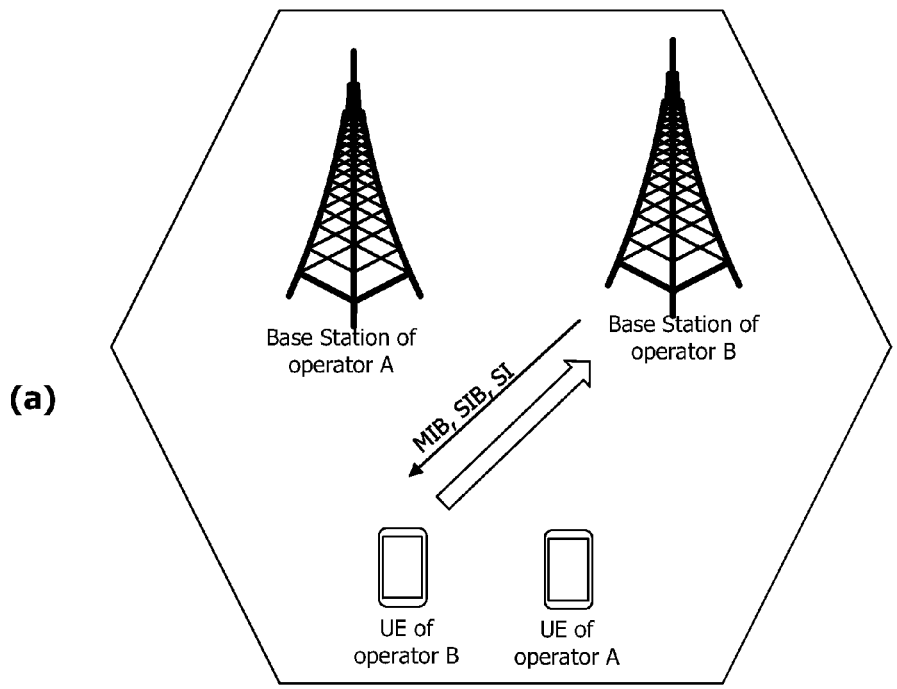
(a)
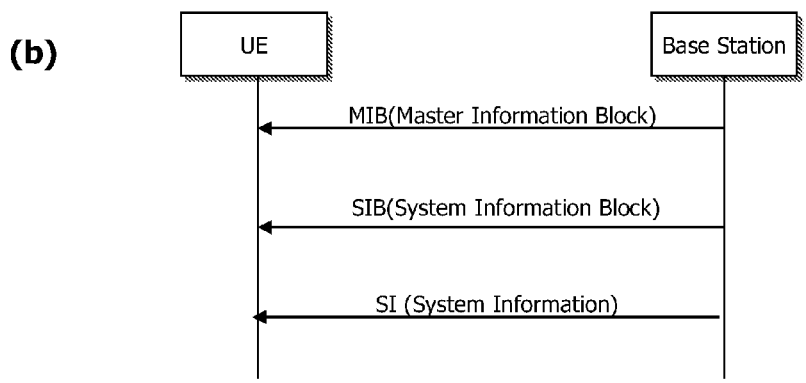
(b)
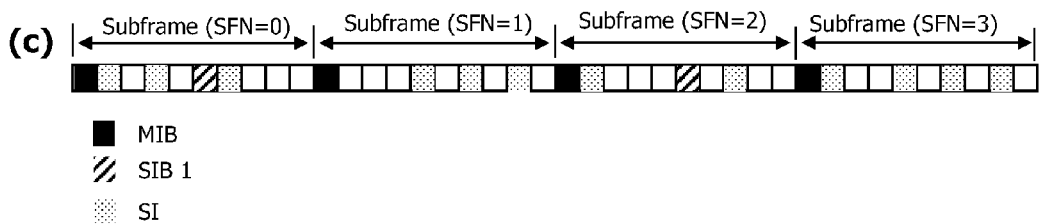
(c)

FIG. 20
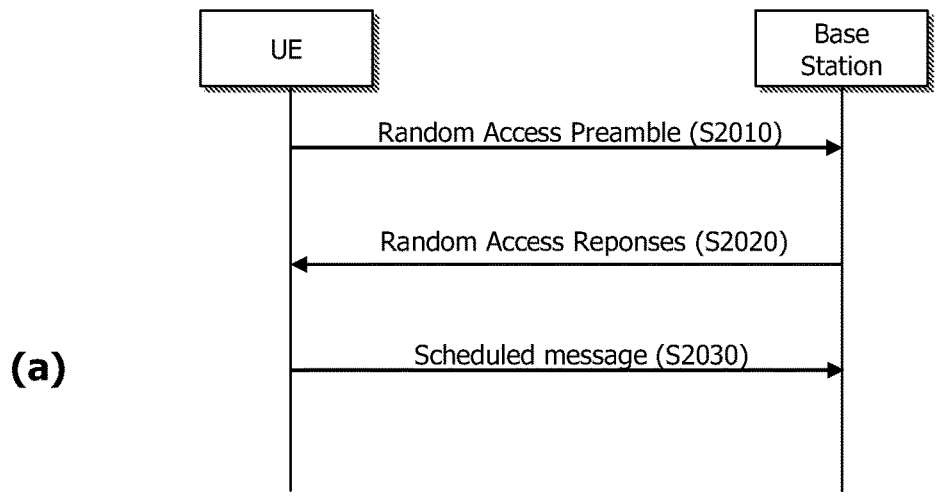
(a)
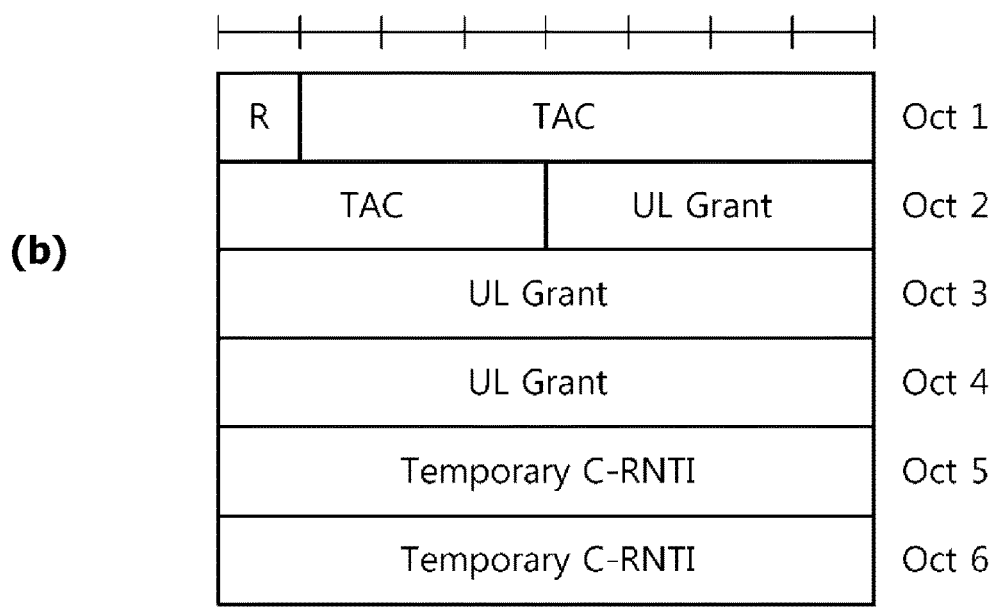
(b)

WIRELESS EQUIPMENT FOR TRANSMITTING UPLINK SIGNAL THROUGH REDUCED TRANSMISSION RESOURCE BLOCK AND POWER, AND ENODEB

CROSS-REFERENCE TO RELATED APPLICATIONS

This application is the National Stage filing under 35 U.S.C. 371 of International Application No. PCT/KR2013/004031, filed on May 8, 2013, which claims the benefit of U.S. Provisional Application Ser. No. 61/647,524, filed on May 16, 2012 and 61/809,886, filed on Apr. 9, 2013, the contents of which are all hereby incorporated by reference herein in their entirety.

BACKGROUND OF THE INVENTION

Field of the Invention

The present invention relates to transmission resource block constraint and power reduction.

Related Art

3GPP (3rd Generation Partnership Project) LTE (long term evolution), an advanced version of UMTS (Universal Mobile Telecommunications System), is introduced in 3GPP release 8.

3GPP LTE adopts OFDMA (orthogonal frequency division multiple access) on downlink and SC-FDMA (Single Carrier-frequency division multiple access) on uplink. Knowledge of OFDM comes first for understanding OFDMA. OFDM may attenuate inter-slice boundary interference with low complexity and thus comes in use. OFDM converts data input in series into N parallel data items and transmits the converted data items on N orthogonal subcarriers. A subcarrier maintains frequency orthogonality. Meanwhile, OFDMA refers to a multiple access scheme that independently provides some of subcarriers available in a system adopting OFDM as its modulation scheme to each user, thus implementing multiple access.

FIG. 1 illustrates a 3GPP LTE wireless communication system.

Referring to FIG. 1, an LTE wireless communication system 10 includes at least one base station (BS) (which is referred to as eNodeB in LTE) 11 and a user equipment 12.

Each base station 11 provides a communication service in particular geographical areas 15a, 15b, and 15c. In this case, communication from the base station to the user equipment is denoted downlink (DL), and communication from the user equipment to the base station is denoted uplink (UL).

In case base stations are presented by a number of service providers in the geographical areas 15a, 15b, and 15c, interference may occur therebetween.

For excluding such interference, each service provider may offer a service with a different frequency band.

However, in case the frequency bands from the service providers are positioned adjacent to each other, the problem of interference still remains. Such interference issue may be addressed by reducing transmission power or restricting the amount of reference blocks (RBs) to substantially increase the frequency interval between neighbor bands. However, the reduced transmission power or restricted transmission resource blocks may result in a reduction in service coverage. Accordingly, a need exists for a method for reducing transmission power or transmission reference blocks to a proper level without causing the interference issue.

SUMMARY OF THE INVENTION

Accordingly, an embodiment of this disclosure aims to provide a scheme that may restrict transmission reference blocks (RBs) and reduce transmission power to decrease a spurious emission that leaks to a neighbor band.

To achieve the above objects, according to an embodiment of the present invention, a wireless apparatus for transmitting an uplink signal in a wireless communication system is provided. The wireless apparatus may comprise a processor; and an RF (Radio Frequency) unit controllable by the processor and configured to support E-UTRA band and transit an uplink signal. If the RF unit is configured to use a predetermined channel bandwidth in a predetermined frequency range and it is required to meet a predetermined permitted maximum level of a spurious emission to protect another frequency range, the uplink signal is transmitted according to a predetermined maximum number of resource blocks (RBs) instead of a total number of resource blocks (RBs) corresponding to the predetermined channel bandwidth.

To achieve the above objects, according to an embodiment of the present invention, a base station receiving an uplink signal in a wireless communication system is provided. The base station may comprise an RF (Radio Frequency) unit configured to support E-UTRA band and transit and receive an uplink signal; and a processor connected with the RF unit and controlling the RF unit. Here, if the RF unit is configured to use a predetermined channel bandwidth in a predetermined frequency range and it is required to meet a predetermined permitted maximum level of a spurious emission to protect another frequency range, the processor assigns an uplink resource according to a predetermined maximum number of resource blocks (RBs) instead of a total number of resource blocks (RBs) corresponding to the predetermined channel bandwidth.

The predetermined number of RBs may be obtained by reducing a portion from the total number of RBs. The maximum lever of spurious emission may be −40 dBm/MHz.

If the predetermined channel bandwidth is 5 MHz, the total number of RBs is 25, and if the predetermined channel bandwidth is 10 MHz, the total number of RBs is 50.

If the predetermined channel bandwidth is 5 MHz, the predetermined number of RB is fewer than or equal to 20 which is obtained by reducing 5 from 25 of the total number of RBs, and if the predetermined channel bandwidth is 10 MHz, the predetermined number of RB is fewer than or equal to 32 which is obtained by reducing 18 from 50 of the total number of RBs.

If the predetermined channel bandwidth is 5 MHz, the predetermined number of RB is fewer than or equal to 20, and if the predetermined channel bandwidth is 10 MHz, the predetermined number of RB is fewer than or equal to 32

The predetermined frequency range corresponds to a operating band 8 defined in 3gpp long term evolution (LTE) standard The operating band 8 may be defined as 880 MHz through 915 MHz for uplink and as 925 MHz through 960 MHz for downlink When the number of the predetermined RBs is represented as $N_{restricted\_RB}$, $N_{restricted\_RB} = N_{full\ RB\ of\ transmission\ bandwidth} - N_{RB\_limitation}$, where $N_{full\ RB\ of\ transmission\ bandwidth}$ may be the number of all of RBs of a transmission bandwidth constituting a channel bandwidth, and $N_{RB\_limitation}$ may be the number of RBs to be limited to satisfy a predetermined permitted value of a spurious emission.

According to this disclosure, an uplink signal is transmitted with transmission resource blocks obtained by excluding limited transmission resource blocks, so that neighboring band spurious emission may be decreased, thus resulting in reduced interference to neighboring channels.

BRIEF DESCRIPTION OF THE DRAWINGS

FIG. 19 illustrates a process of delivering system information.

FIG. 20 illustrates a process of transmitting uplink data by a user equipment.

DESCRIPTION OF EXEMPLARY EMBODIMENTS

Figure 1:
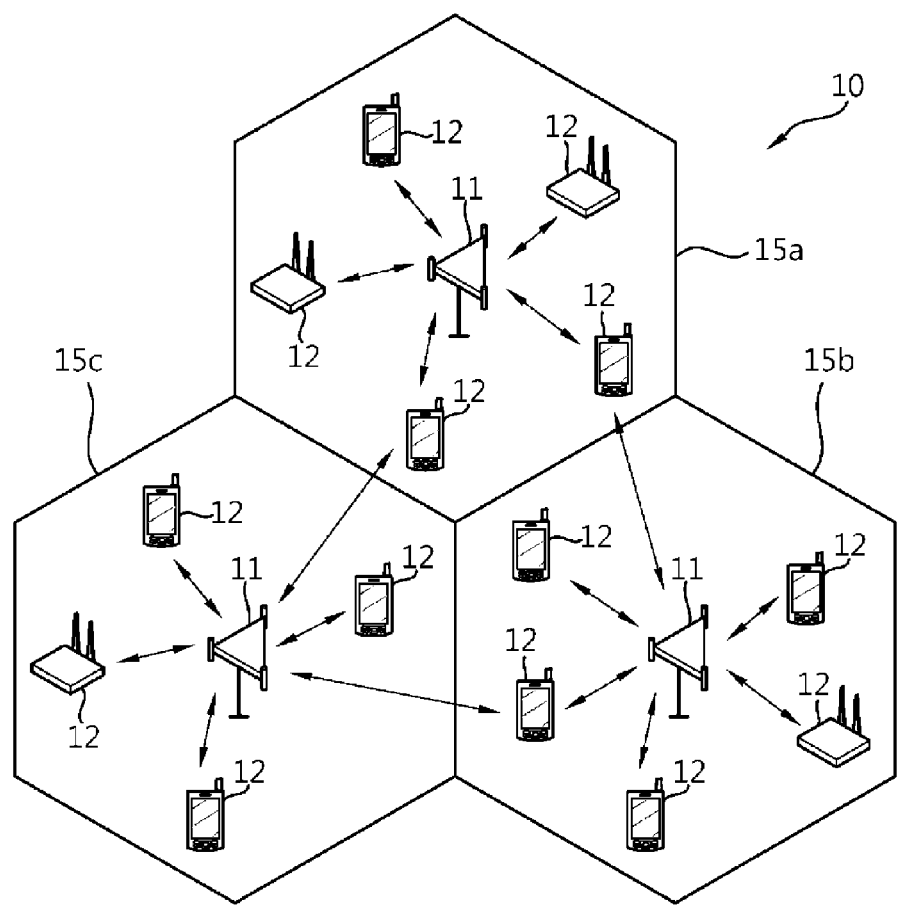
FIG. 1 illustrates a 3GPP LTE wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined in the 3GPP adopts such MIMO. Hereinafter, LTE systems are described in greater detail.

Figure 2:
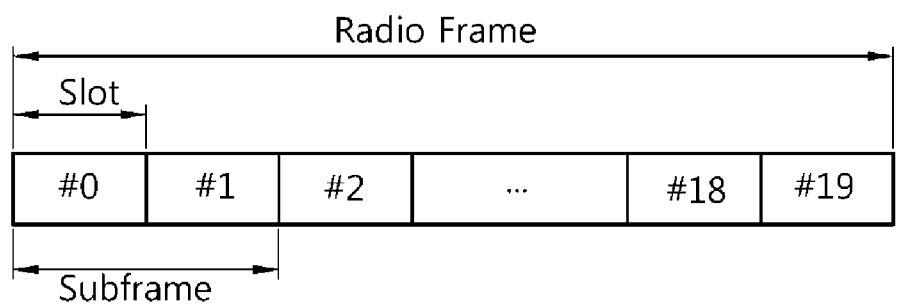
FIG. 2 illustrates the structure of a radio frame in 3GPP LTE.

FIG. 2 illustrates the structure of a radio frame in 3GPP LTE.

Referring to FIG. 2, a radio frame includes 10 sub-frames, and one sub-frame includes two slots. The slots in the radio frame are marked with slot numbers 0 through 19. The time taken for one sub-frame to be transmitted is referred to as a TTI (transmission time interval). The TTI may be the unit of scheduling for data transmission. For example, the length of one radio frame may be 10 ms, the length of one sub-frame may be 1 ms, and the length of one slot may be 0.5 ms.

The structure of a radio frame is merely an example, and the number of sub-frames included in the radio frame or the number of slots included in a sub-frame may vary differently.

Figure 3:
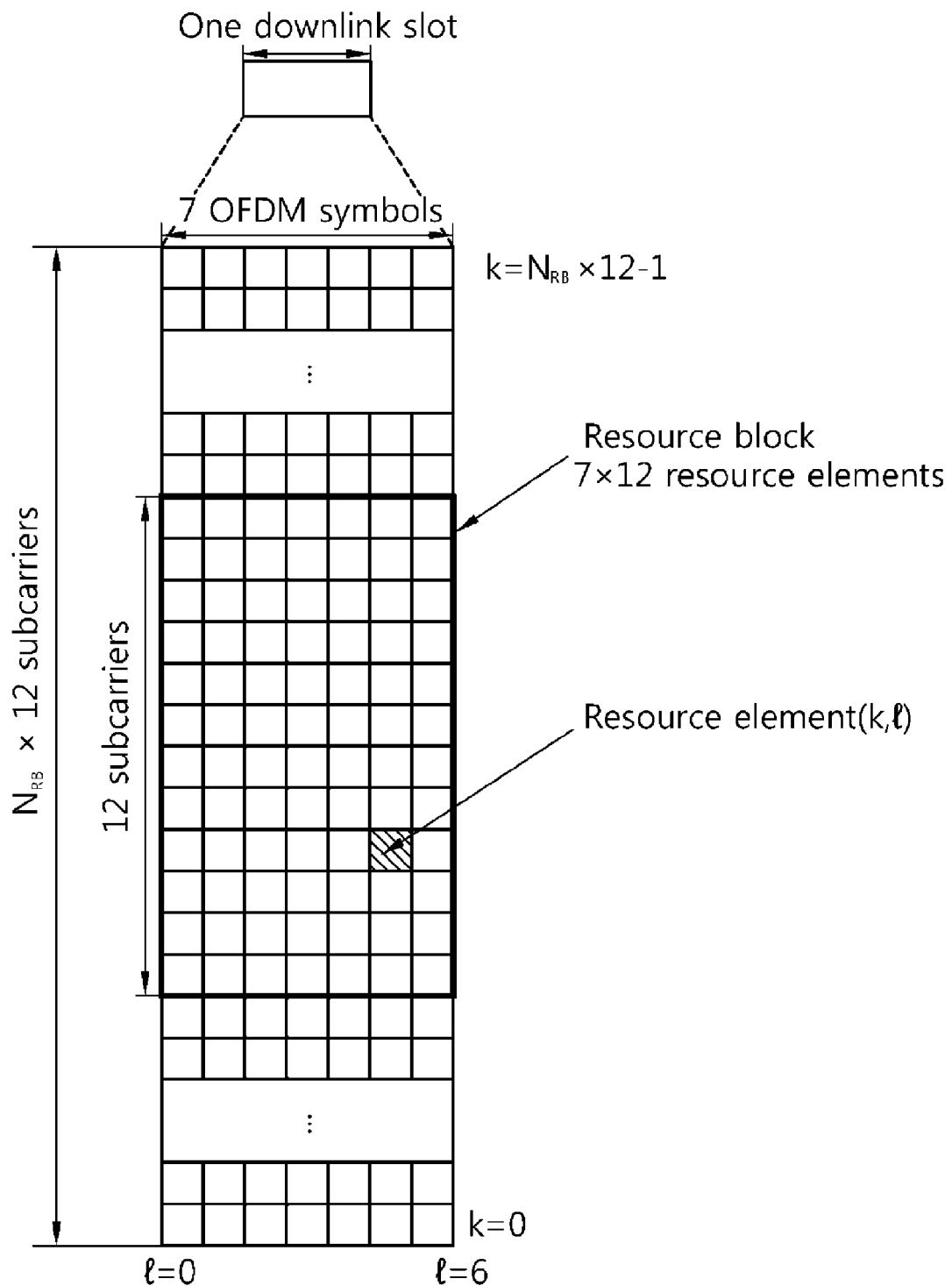
FIG. 3 illustrates an example of a resource grid for one uplink slot in 3GPP LTE.

FIG. 3 illustrates an example resource grid for one uplink slot in 3GPP LTE.

Referring to FIG. 3, an uplink slot includes a plurality of OFDM (orthogonal frequency division multiplexing) slice boundary in the time domain and $N^{UL}$ reference blocks (RBs) in the frequency domain. The OFDM symbol is to represent one symbol period, and depending on systems, may be denoted an SC-FDMA symbol, OFDMA symbol, or symbol period. The resource block is the unit of resource allocation and includes a plurality of sub-carriers in the frequency domain. The number, $N^{UL}$, of resource blocks included in the uplink slot, depends upon an uplink transmission bandwidth configured in a cell. Each element over a resource grid is denoted a resource element.

Here, although one resource block includes 7×12 resource elements comprising seven OFDM symbols in the time domain and 12 sub-carriers in the frequency domain, as an example, the number of sub-carriers in the resource block and the number of OFDM symbols are not limited thereto. The number of OFDM symbols or the number of sub-carriers included in the resource block may change in various ways. The number of OFDM symbols may vary depending on the length of a cyclic prefix (hereinafter, "CP"). For example, in the case of normal CP, the number of OFDM symbols is 7, and in the case of extended CP, the number of OFDM symbols is 6.

In 3GPP LTE, the resource grid for one uplink slot shown in FIG. 3 may also apply to the resource grid for the downlink slot.

Figure 4:
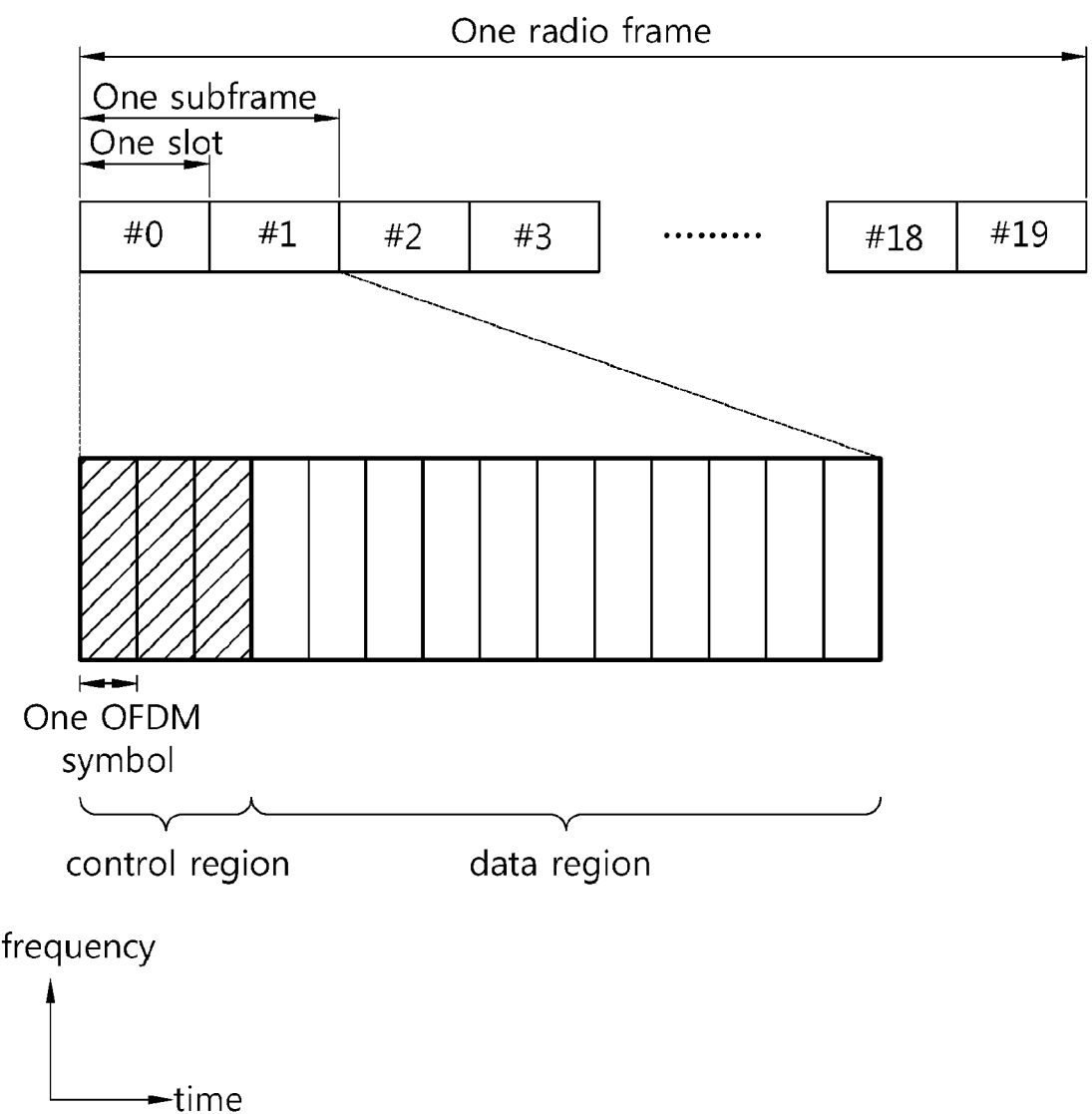
FIG. 4 illustrates the structure of a downlink sub-frame.

FIG. 4 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Although one slot includes seven OFDM symbols for example, the number of OFDM symbols included in one slot may vary depending on the length of the CP (Cyclic Prefix).

According to 3GPP TS 36.211 V10.4.0, in the case of normal CP, one slot includes seven OFDM symbols, and in the case of extended CP, one slot includes six OFDM symbols.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 5:
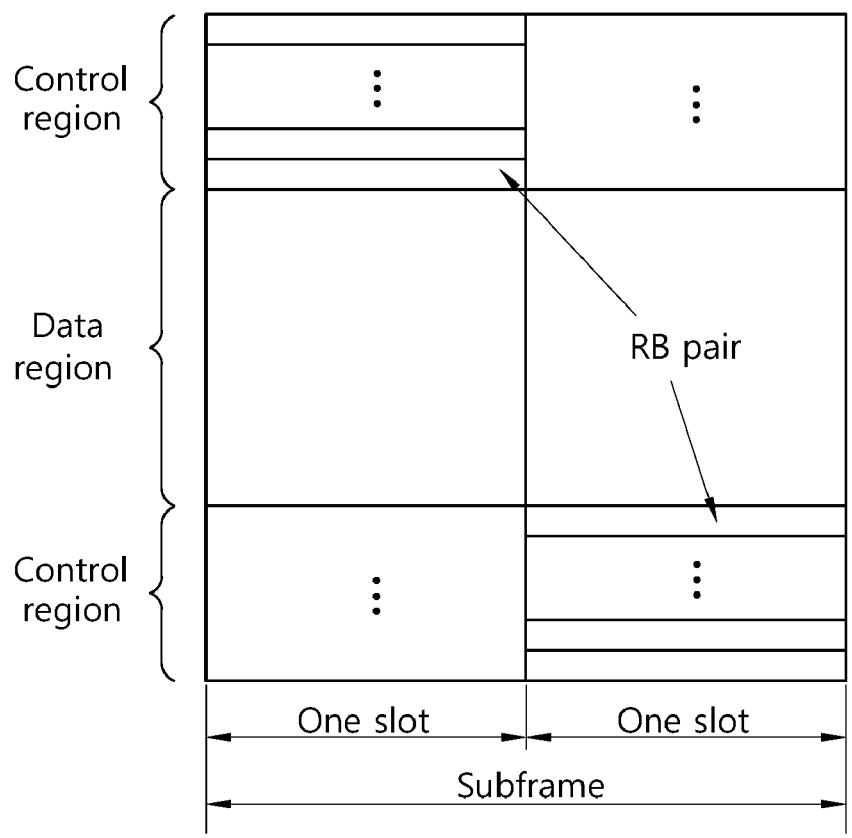
FIG. 5 illustrates the structure of a UL sub-frame in 3GPP LTE.

FIG. 5 illustrates the architecture of a UL sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one user equipment is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. A frequency diversity gain may be obtained by transmitting uplink control information through different sub-carriers over time.

Figure 6:
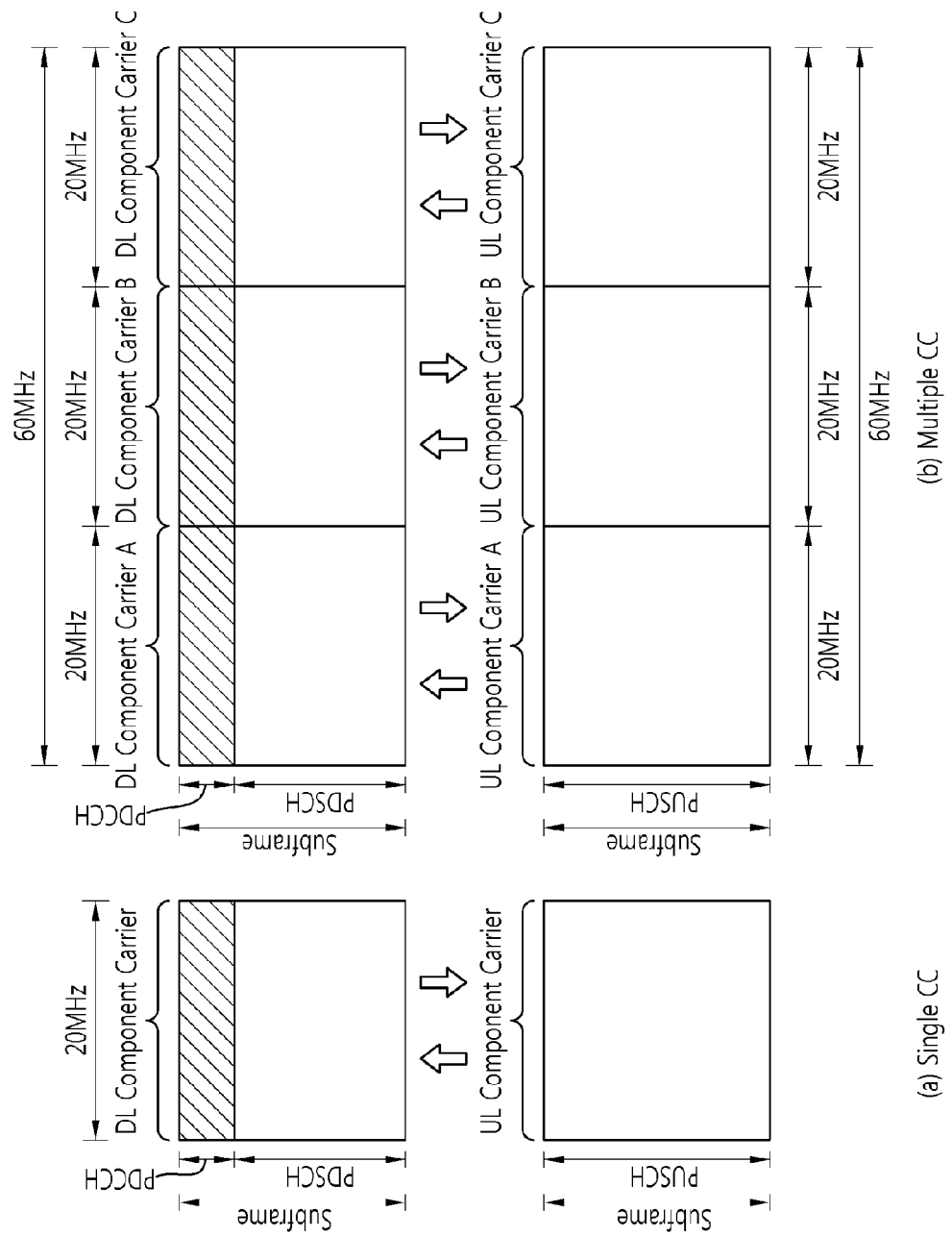
FIG. 6 illustrates an example comparison between an existing single carrier system and a carrier aggregation system.

FIG. 6 illustrates an example of comparison between an existing single carrier system and a carrier aggregation system.

Referring to FIG. 6(a), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 6 primarily focuses on the FDD scheme for ease of description, the foregoing may be applicable to the TDD scheme by separating the radio frame for uplink/downlink in the time domain.

As shown in FIG. 6(a), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 6(b) may correspond to a communication example in an LTE-A system.

Referring to FIG. 6(b), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 6(b) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 6(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Figure 7:
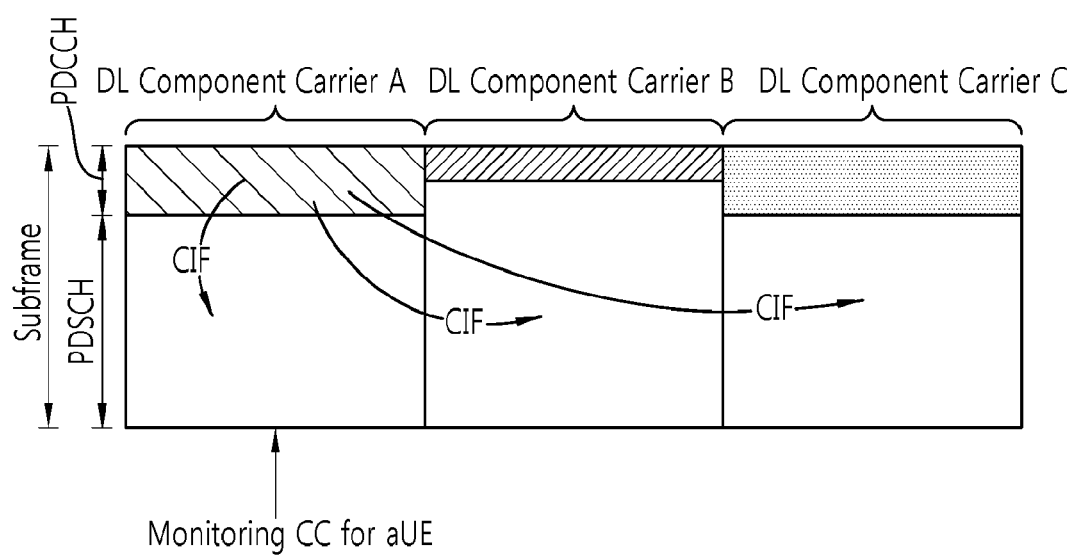
FIG. 7 exemplifies cross-carrier scheduling in a carrier aggregation system.

FIG. 7 exemplifies cross-carrier scheduling in the carrier aggregation system.

Referring to FIG. 7, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 7 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 8:
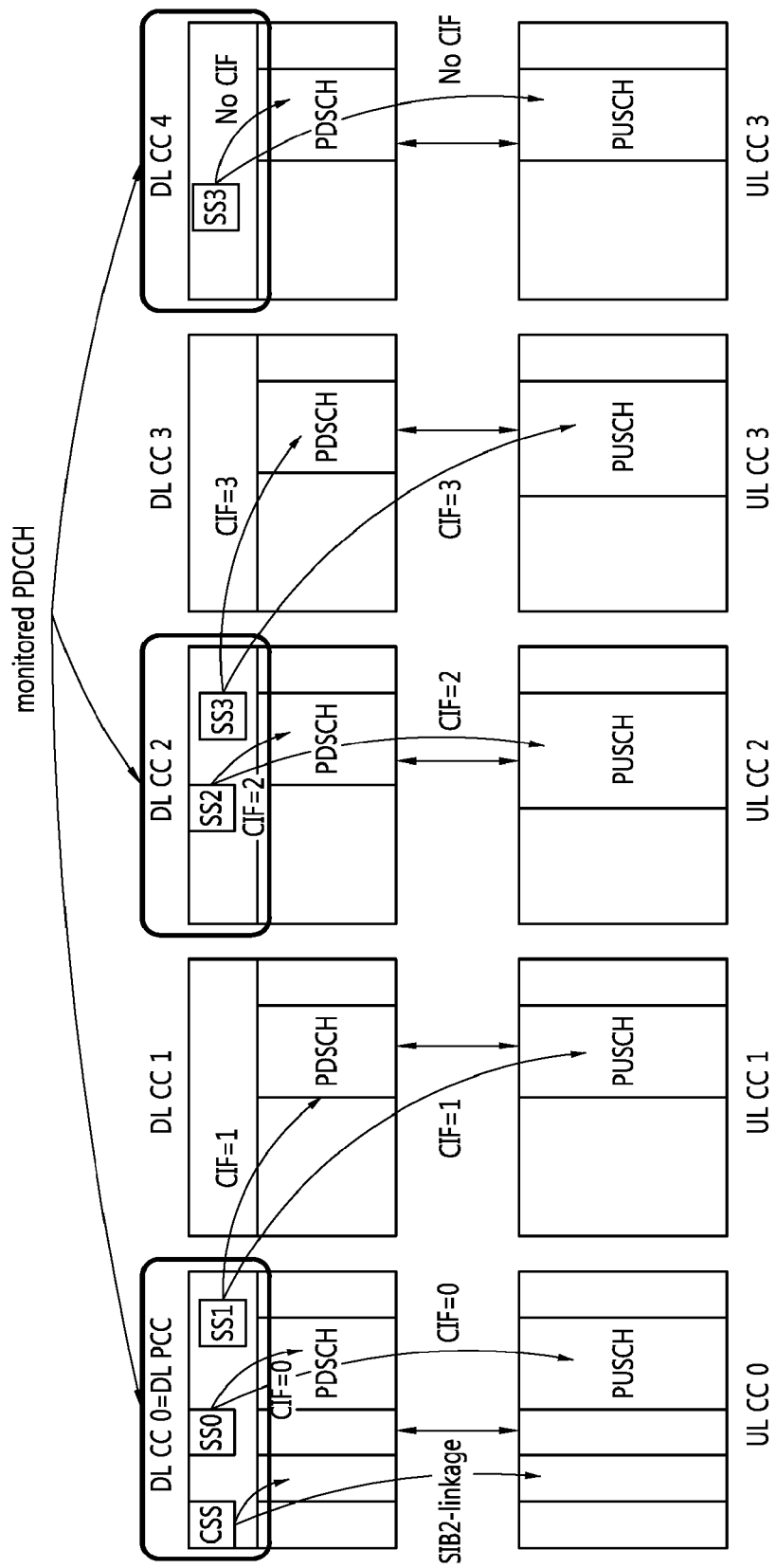
FIG. 8 illustrates example scheduling when cross-carrier scheduling is set in a carrier aggregation system.

FIG. 8 illustrates an example of scheduling performed when cross-carrier scheduling is configured in a cross-carrier scheduling.

Referring to FIG. 8, DL CC 0, DL CC 2, and DL CC 4 belong to a PDCCH monitoring DL CC set. The user equipment searches for DL grants/UL grants for DL CC 0 and UL CC 0 (UL CC linked to DL CC 0 via SIB 2) in the CSS of DL CC 0. The user equipment searches for DL grants/UL grants for DL CC 1 and UL CC 1 in SS 1 of DL CC 0. SS 1 is an example of USS. That is, SS 1 of DL CC 0 is a space for searching for a DL grant/UL grant performing cross-carrier scheduling.

Meanwhile, an SC-FDMA transmission method is now described below.

SC-FDMA

The SC (Single-Carrier)-FDMA has been adopted for LTE (Long-Term Evolution) uplink, which is similar to OFDM (Orthogonal Frequency Division Multiplexing).

SC-FDMA may be said to be DFT-s OFDM (DFT-spread OFDM). When using the SC-FDMA transmission scheme, the non-linear distortion of power amplifier may be avoided, thus allowing power consumption-limited user equipment to enjoy increased transmission power efficiency. Accordingly, user throughput may be increased.

SC-FDMA is similar to OFDM in that SC-FDMA also employs FFT (Fast Fourier Transform) and IFFT (Inverse-FFT). However, the problem with the existing OFDM transmitters is that signals over each sub-carrier on frequency axis are converted to signals on time axis by IFFT. That is, IFFT is in the form of performing the same parallel operation, thus causing an increase in PAPR (Peak to Average Power Ratio). To prevent such increase in PAPR, SC-FDMA, unlike OFDM, performs IFFT after DFT spreading. In other words, the transmission scheme of performing IFFT after DFT spreading is referred to as SC-FDMA. Thus, SC-FDMA is also called DFT spread OFDM (DFT-s-OFDM).

Such advantages of SC-FDMA led to being robust for multi-path channels thanks to similar structure to OFDM while enabling efficient use of power amplifier by fundamentally solving the problem of existing OFDM that OFDM causes increased PAPR due to IFFT operation.

Figure 9:
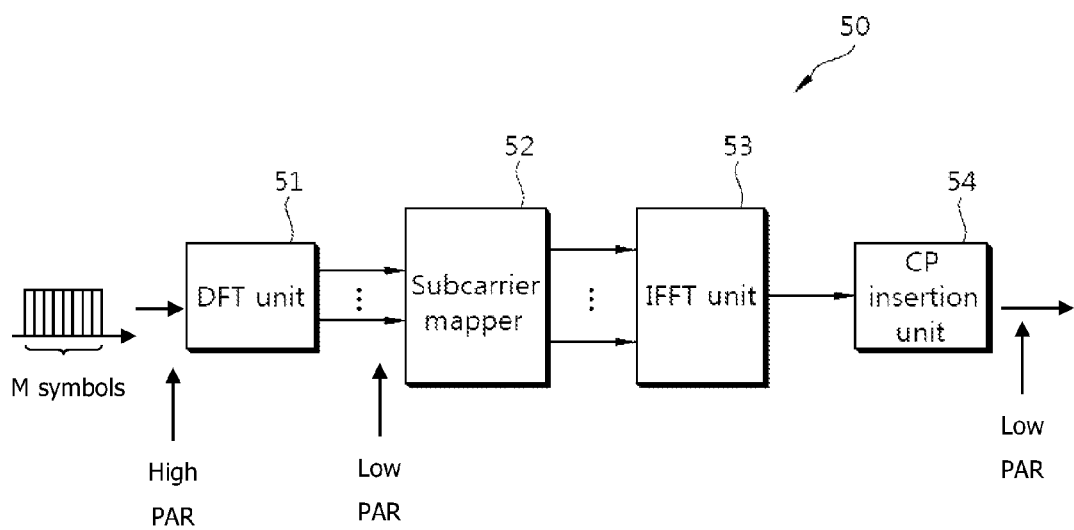
FIG. 9 is a block diagram illustrating an SC-FDMA transmission scheme that is an uplink access scheme adopted by 3GPP LTE.

FIG. 9 is a block diagram illustrating an SC-FDMA transmission scheme that is an uplink access scheme adopted in 3GPP LTE.

Referring to FIG. 9, a transmitter 50 may include a DFT (Discrete Fourier Transform) unit 51, a sub-carrier mapper 52, an IFFT unit 53, and a CP inserting unit 54. The transmitter 50 may include a scramble unit (not shown), a modulation mapper (not shown), a layer mapper (not shown), and a layer permutator (not shown), which may be positioned ahead of the DFT unit 51.

To prevent the above-described increase in PAPR, the SC-FDMA transmitter subjects information to the DFT unit 51 prior to mapping a signal to a sub-carrier. The signal spread (, or in the same concept, precoded) by the DFT unit 51 is sub-carrier mapped through the sub-carrier mapper 52, which then goes through the IFFT (Inverse Fast Fourier Transform) unit 53, thus producing a signal over time axis.

That is, thanks to the correlation between the DFT unit 51, the sub-carrier mapper 52, and the IFFT unit 53, SC-FDMA does not significantly increase the PAPR (peak-to-average power ratio) of a time-domain signal after undergoing the IFFT unit 53, unlike OFDM, and is thus advantageous in light of transmission power efficiency. In other words, SC-FDMA may experience a decrease in PAPR or CM (cubic metric).

The DFT unit 51 performs DFT on input symbols to output complex valued symbols. For example, if $N_{fx}$ symbols are input (where, $N_{fx}$ is a natural number), the DFT size is $N_{fx}$. The DFT unit 51 may also be called a transform precoder. The sub-carrier mapper 52 maps the complex valued symbols to respective sub-carriers in the frequency domain. The complex valued symbols may be mapped to resource elements corresponding to the resource block assigned for data transmission. The sub-carrier mapper 52 may be called a resource element mapper. The IFFT unit 53 performs IFFT on the input symbols to output a baseband signal for data that is a time-domain signal. The CP inserting unit 54 copies a tail portion of the baseband signal for data and inserts the copied portion to a head portion of the baseband signal for data. ISI (Inter-Symbol Interference) and ICI (Inter-Carrier Interference) may be prevented through CP insertion, thus allowing orthogonality to be maintained also in the multi-path channel.

Meanwhile, 3GPP is actively standardizing LTE-Advanced that is an advanced version of LTE and has adopted clustered DFT-s-OFDM scheme that permits non-contiguous resource allocation.

The clustered DFT-s-OFDM transmission scheme is a variation to the existing SC-FDMA transmission scheme and divides the data symbols that were subjected to a precoder into a plurality of sub-blocks and performs mapping with the sub-blocks separated from each other in the frequency domain.

Meanwhile, the LTE-A system is described below in greater detail.

Some major features of the clustered DFT-s-OFDM scheme include enabling frequency-selective resource allocation so that the scheme may flexibly deal with a frequency selective fading environment.

In this case, the clustered DFT-s-OFDM scheme adopted as an uplink access scheme for LTE-advanced, unlike the conventional LTE uplink access scheme, i.e., SC-FDMA, permits non-contiguous resource allocation, so that uplink data transmitted may be split into several units of cluster.

In other words, while the LTE system is rendered to maintain single carrier characteristics in the case of uplink, the LTE-A system allows for non-contiguous allocation of DFT_precoded data on frequency axis or simultaneous transmission of PUSCH and PUCCH. In such case, the single carrier features are difficult to maintain.

Figure 10:
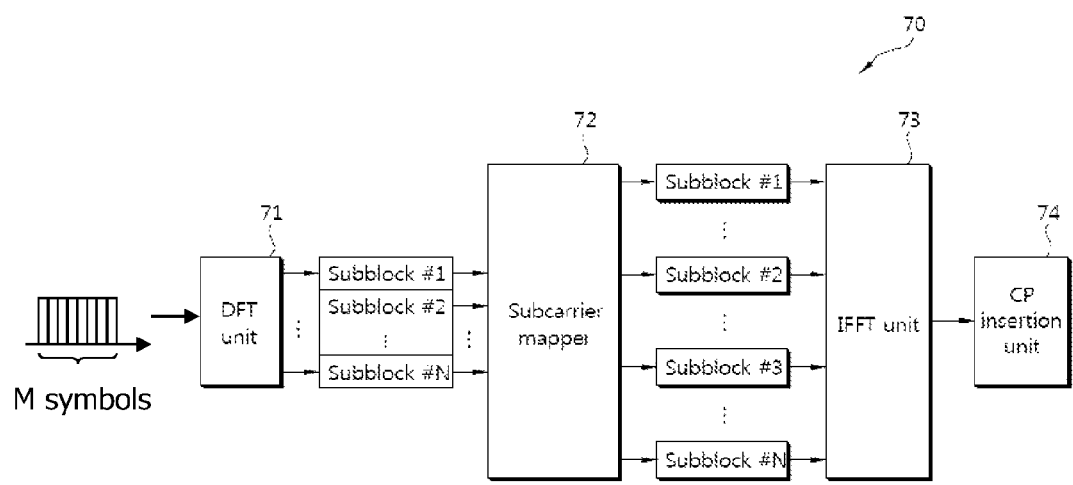
FIG. 10 illustrates an example transmitter to which a clustered DFT-s-OFDM transmission scheme applies.

FIG. 10 illustrates an example of a transmitter to which the clustered DFT-s-OFDM transmission scheme applies.

Referring to FIG. 10, a transmitter 70 includes a DFT unit 71, a sub-carrier mapper 72, an IFFT unit 73, and a CP inserting unit 74. The transmitter 70 may include a scramble unit (not shown), a modulation mapper (not shown), a layer mapper (not shown), and a layer permutator (not shown), which may be positioned ahead of the DFT unit 71.

Complex valued symbols output from the DFT unit 71 are divided into N sub-blocks (N is a natural number). The N sub-blocks may be represented sub-block #1, sub-block #2, . . . , sub-block #N. The sub-carrier mapper 72 scatters the N sub-blocks in the frequency domain and maps the same to sub-carriers. Each NULL may be inserted between two contiguous sub-blocks. The complex valued symbols in one sub-block may be mapped to contiguous sub-carriers in the frequency domain. That is, a concentrated mapping scheme may be used in one sub-block.

The transmitter 70 shown in FIG. 10 may be utilized for both a single carrier transmitter and a multi-carrier transmitter. In case the transmitter 70 is used for a single carrier transmitter, N sub-blocks all correspond to one carrier. In case the transmitter 70 is used for a multi-carrier transmitter, each of the N sub-blocks may correspond to one carrier. Or, even when the transmitter 70 is used for a multi-carrier transmitter, a plurality of ones of the N sub-blocks may correspond to one carrier. Meanwhile, in the transmitter 70 shown in FIG. 11, a time-domain signal is generated through one IFFT unit 73. Accordingly, in order for the transmitter 70 of FIG. 11 to be used for a multi-carrier transmitter, the sub-carrier interval between adjacent carriers should be aligned under the contiguous carrier allocation circumstance.

Now, the reason why transmit power control is needed is described below in connection with FIG. 11 prior to describing a transmit power control method according to an aspect of the present invention.

Figure 11:
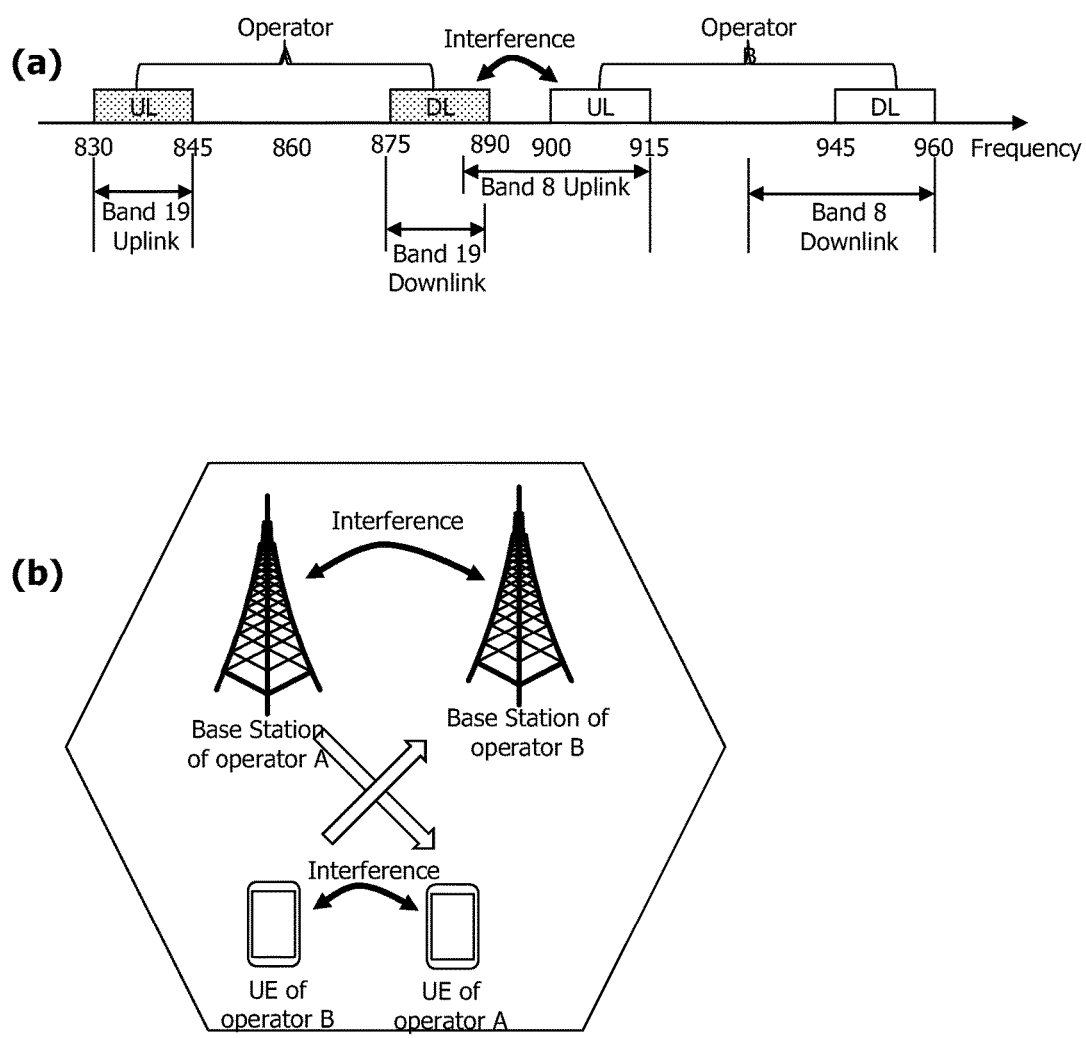
FIG. 11 illustrates an example in which interference occurs when an operator uses a band adjacent to a band of another operator.

FIG. 11 illustrates an example in which interference occurs when in the LTE system an operator uses a band adjacent to a band of another operator.

First, operating bands in the 3GPP LTE system are defined for uplink and downlink as in the following table.

TABLE 1

| E-UTRA operating band | Uplink operating band $F_{UL\_low}$-$F_{UL\_high}$ | Downlink operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 806 MHz-824 MHz | 851 MHz-869 MHz | FDD |
| 28 | 703 MHz-748 MHz | 758 MHz-803 MHz | FDD |
| 29 | | 716 MHz-728 MHz | FDD |
| . . . | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |

TABLE 1-continued

| E-UTRA operating band | Uplink operating band $F_{UL\_low}$-$F_{UL\_high}$ | Downlink operating band $F_{DL\_low}$-$F_{DL\_high}$ | Duplex Mode |
|---|---|---|---|
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | |

Here, $F_{UL\_low}$ refers to the lowest frequency in the uplink operating band. $F_{UL\_high}$ refers to the highest frequency in the uplink operating band. Further, $F_{DL\_low}$ refers to the lowest frequency in the downlink operating band. $F_{DL\_high}$ refers to the highest frequency in the downlink operating band.

When the operating bands are defined as in Table 1 above, each nation's organization for frequency allocation may assign a particular frequency to a service provider to fit the nation's circumstances.

Referring to FIG. 11(a), operator A is assigned 830 MHz to 845 MHz for uplink and 875 MHz to 890 MHz for downlink in operating band 19, and operator B is assigned 900 MHz to 915 MHz which is a portion of the uplink of operating band 8 and 940 MHz to 960 MHz which is a portion of downlink of operating band 8.

Under such circumstance, in case as shown in FIG. 11(b), operator A and operator B simultaneously provide a service, the spurious radiation on uplink (e.g., 900 to 915 MHz band) transmitted from operator B's user equipment to the base station interferes with the receiving band (e.g., 875 to 890 MHz band) of operator A's user equipment. Further, the spurious radiation by the downlink (e.g., 875 to 890 MHz band) transmitted from operator A's base station to the user equipment interferes with the receiving band (e.g., 900 to 915 MHz) of operator B's base station. That is, an unwanted emission occurs between adjacent bands. Among these, the interference by the base station transmission spurious emission in the downlink band may be reduced to a permitted reference or less for the amount of interference to an adjacent band base station receiving band by designing a high-price, large-size RF filter for the base station. In contrast, as far as user equipment is concerned, it is difficult to fully prevent the spurious radiation from interfering with the adjacent band user equipment receiving band due to limitations on the size of UE and the price of power amplifier or pre-duplex filter RF component. In particular, such phenomenon may be more serious when an interfering UE transmitting band is positioned close to an interfered UE receiving band.

Accordingly, there is a need for a scheme to restrict the number of transmission resource blocks to be assigned or user equipment transmit power in order to prevent the amount of interference by the user equipment spurious emission from going beyond a permitted value. As described above, however, simply reducing the transmit power or the number of resource blocks assigned also results in reduced coverage. Accordingly, a need exists for a scheme of reducing transmit power to a proper level by assigning the maximum transmit power or the maximum number of resource blocks within a range in which no problem with interference occurs.

Prior to describing the scheme of restricting transmit power or transmission resource blocks, the maximum power actually available by the user equipment may be simply represented as follows:

$$Pcmax = Min(Pemax, Pumax)$$ [Equation 1]

Here, Pcmax refers to the maximum power (actual maximum transmit power) that may be transmitted from the user equipment in a corresponding cell, and Pemax refers to the maximum power available by the base station in a corresponding cell where the base station conducts signaling. Further, Pumax denotes power considering the maximum power reduction (hereinafter, "MPR") and additive-MPR (hereinafter, "A-MPR") in addition to the maximum power (PpowerClass) of the user equipment itself.

The maximum power output varies depending on the channel band, whether CA is used, and whether MIMO is used.

First, when CA and MIMO are not used, the maximum power output is as shown in the following table 2.

TABLE 2

| EUTRA band | Class 3 (dBm) | Permitted value (dB) |
|---|---|---|
| 1 | 23 | ±2 |
| 2 | 23 | ±22 |
| 3 | 23 | ±22 |
| 4 | 23 | ±2 |
| 5 | 23 | ±2 |
| 6 | 23 | ±2 |
| 7 | 23 | ±22 |
| 8 | 23 | ±22 |
| 9 | 23 | ±2 |
| 10 | 23 | ±2 |
| 11 | 23 | ±2 |
| 12 | 23 | ±22 |
| 13 | 23 | ±2 |
| 14 | 23 | ±2 |
| ... | | |
| 17 | 23 | ±2 |
| 18 | 23 | ±2 |
| 19 | 23 | ±2 |
| 20 | 23 | ±22 |
| 21 | 23 | ±2 |
| 22 | 23 | ±2 |
| 23 | 23 | ±2 |
| 24 | 23 | ±2 |
| 25 | 23 | ±2 |
| ... | | |
| 33 | 23 | ±2 |
| 34 | 23 | ±2 |
| 35 | 23 | ±2 |
| 36 | 23 | ±2 |
| 37 | 23 | ±2 |
| 38 | 23 | ±2 |
| 39 | 23 | ±2 |
| 40 | 23 | ±2 |
| 41 | 23 | ±2 |

TABLE 2-continued

| EUTRA band | Class 3 (dBm) | Permitted value (dB) |
|---|---|---|
| 42 | 23 | +2/−3 |
| 43 | 23 | +2/−3 |

In the above table, dBm is the unit of power (Watt), where 1 mW=0 dBm.

As such, in the current LTE system, the maximum power (PPowerClass) of the user equipment itself is defined as Power Class 3, which means power of 23 dBm.

As shown above, the maximum power output represents the value measured during one sub-frame length (1 ms) in the antenna of each UE.

In contrast, when the user equipment is equipped with two transmit antennas and uses a spatial multiplexing scheme, the maximum power output is as shown in the following table 3.

TABLE 3

| EUTRA band | Class 3 (dBm) | Permitted value (dB) |
|---|---|---|
| 1 | 23 | −0.6666667 |
| 2 | 23 | −0.0625 |
| 3 | 23 | −0.0625 |
| 4 | 23 | −0.6666667 |
| 5 | 23 | −0.6666667 |
| 6 | 23 | −0.6666667 |
| 7 | 23 | −0.0625 |
| 8 | 23 | −0.0625 |
| 9 | 23 | −0.6666667 |
| 10 | 23 | −0.6666667 |
| 11 | 23 | −0.6666667 |
| 12 | 23 | −0.0625 |
| 13 | 23 | −0.6666667 |
| 14 | 23 | −0.6666667 |
| 17 | 23 | −0.6666667 |
| 18 | 23 | −0.6666667 |
| 19 | 23 | −0.6666667 |
| 20 | 23 | −0.0625 |
| 21 | 23 | −0.6666667 |
| 22 | | −0.4424779 |
| 23 | 23 | −0.6666667 |
| 24 | 23 | −0.6666667 |
| 25 | 23 | −0.0625 |
| ... | | |
| 33 | 23 | −0.6666667 |
| 34 | 23 | −0.6666667 |
| 35 | 23 | −0.6666667 |
| 36 | 23 | −0.6666667 |
| 37 | 23 | −0.6666667 |
| 38 | 23 | −0.6666667 |
| 39 | 23 | −0.6666667 |
| 40 | 23 | −0.6666667 |
| 41 | 23 | −0.0625 |
| 42 | 23 | −0.5 |
| 43 | 23 | −0.5 |

As can be seen from Tables 2 and 3 above, the maximum power (PPowerClass) of the user equipment itself is 23 dBm.

Hereinafter, influence of neighboring bands to each other is described in greater detail.

Figure 12:
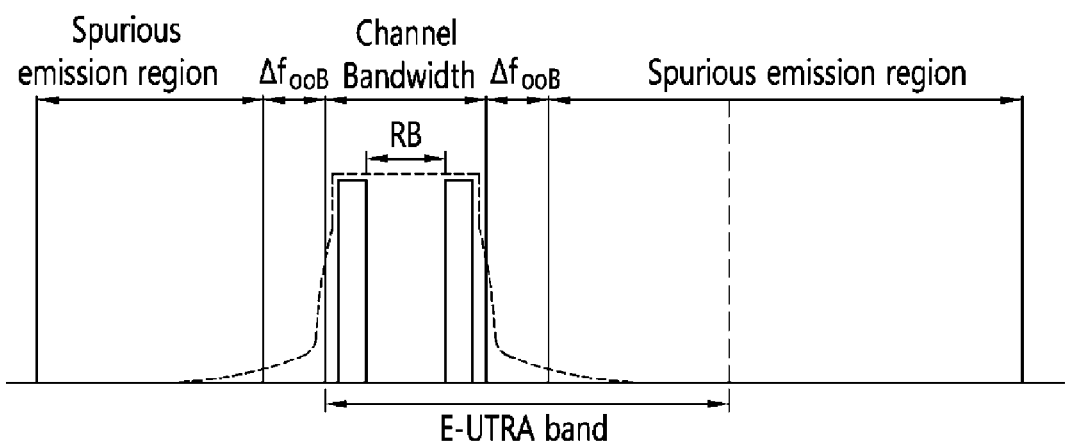
FIG. 12 illustrates the concept of unwanted emission.
Figure 13:
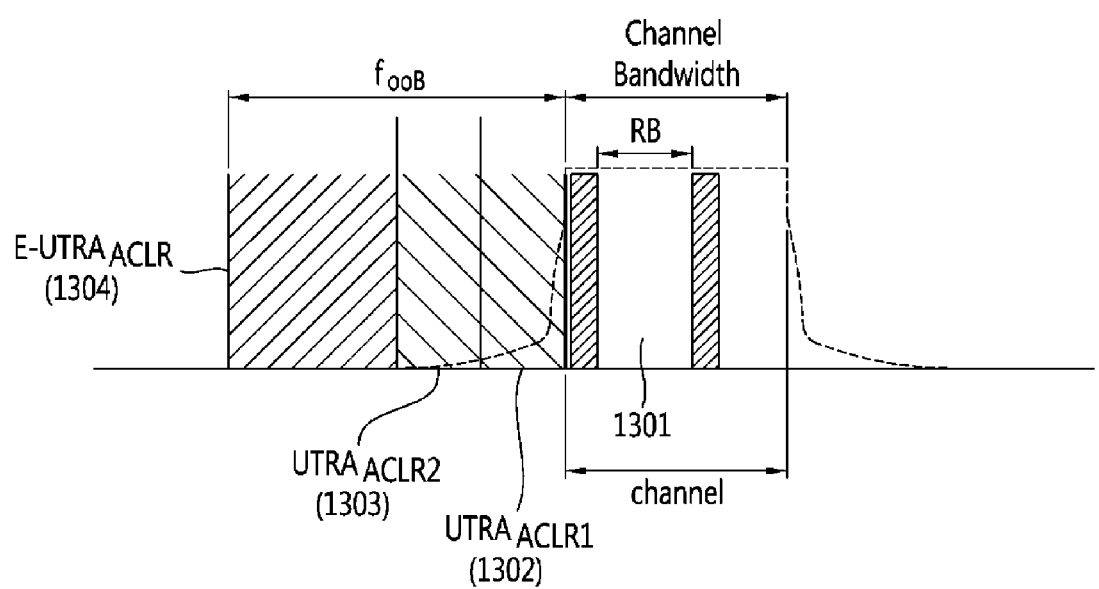
FIG. 13 specifically illustrates emission in an out-of-band among unwanted emissions as shown in FIG. 12.
Figure 14:
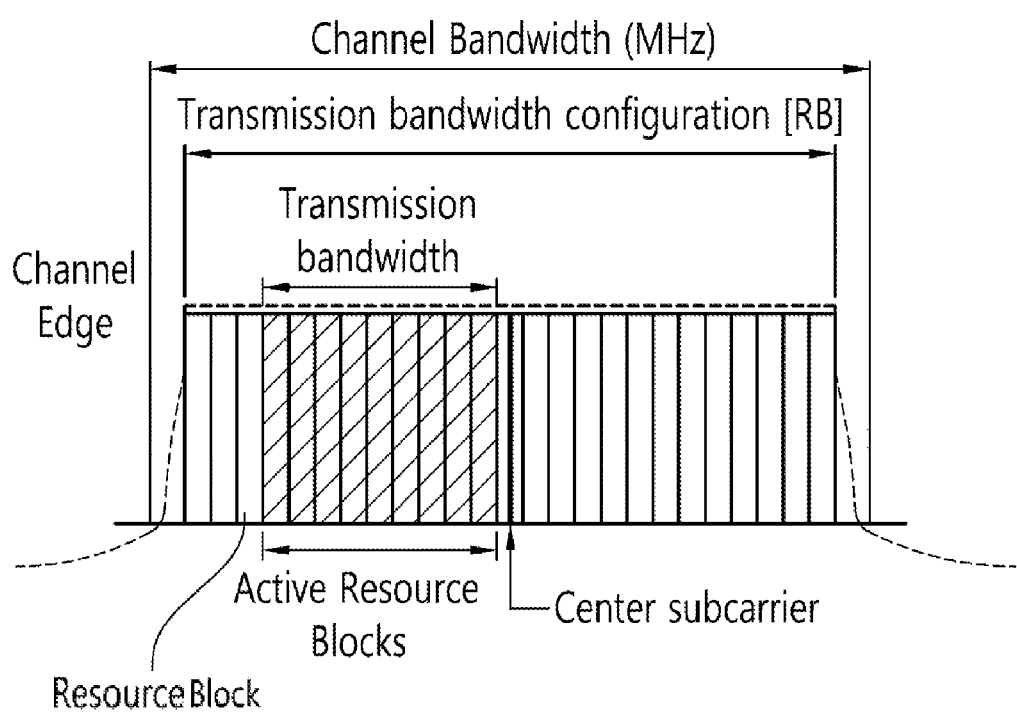
FIG. 14 illustrates the relationship between the channel band (MHz) and the resource blocks (RBs) shown in FIG. 12.

FIG. 12 illustrates the concept of unwanted emission, FIG. 13 specifically illustrates an emission at an external band among unwanted emissions as shown in FIG. 12, and FIG. 14 illustrates the relationship between resource blocks (RBs) and the channel band (MHz) shown in FIG. 12.

As can be seen in connection with FIG. 12, any transmitter transmits a signal over a channel bandwidth assigned in any E-UTRA band.

Here, the channel bandwidth is defined as can be seen with reference to FIG. 14. That is, the transmission bandwidth configuration is made to be smaller than the channel bandwidth ($BW_{Channel}$). The transmission bandwidth configuration is made by a plurality of resource blocks (RBs). The channel edges are the highest and lowest frequencies separated by the channel bandwidth.

Meanwhile, as described above, the 3GPP LTE system supports 1.4 MHz, 3 MHz, 5 MHz, 10 MHz, 15 MHz, and 20 MHz as its channel bandwidths. The relationship between such channel bandwidths and the number of resource blocks is as shown in the following table.

TABLE 4

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Turning back to FIG. 12, an unwanted emission occurs in the $\Delta f_{OOB}$ band, and as shown, an unwanted emission occurs in the spurious region as well. Here, $\Delta f_{OOB}$ means the magnitude of frequency in an out of band (OOB). Meanwhile, the emission on the out of band refers to an emission occurring in a band close to an intended transmission band. The spurious emission refers to an unwanted emission spreading up to a frequency band far away from the intended transmission band.

Meanwhile, 3GPP release 10 defines the basic spurious emissions that are the minimum values beyond which the respective frequency bands should not go. This is represented as in the following table.

TABLE 5

| Frequency band | Maximum level | Measurement band |
|---|---|---|
| 9 kHz ≤ f < 150 kHz | −36 dBm | 1 kHz |
| 150 kHz ≤ f < 30 MHz | −36 dBm | 10 kHz |
| 30 MHz ≤ f < 1000 MHz | −36 dBm | 100 kHz |
| 1 GHz ≤ f < 12.75 GHz | −30 dBm | 1 MHz |

Meanwhile, as shown in FIG. 13, if transmission is performed in the E-UTRA channel band 1301, leakage, i.e., an unwanted emission, occurs to out-of-bands (1302, 1303, and 1304 in the shown $f_{OOB}$ region).

Here, $UTRA_{ACLR1}$ refers to a ratio in which leakage to a neighboring channel 1302, i.e., the UTRA channel, occurs—i.e., a neighboring channel leakage ratio—in case the neighboring channel 1302 is for UTRA when the user equipment performs transmission on the E-UTRA channel 1301. $UTRA_{ACLR2}$ refers to a ration in which leakage to a neighboring channel 1303, i.e., the UTRA channel, positioned to the neighboring channel 1302—i.e., a neighboring channel leakage ratio—in case the neighboring channel 1303 is for UTRA as shown in FIG. 13. $E\text{-}UTRA_{ACLR}$ refers to a ratio in which leakage to a neighboring channel, i.e., an E-UTRA channel, occurs—i.e., a neighboring channel leakage ratio—when the user equipment performs transmission on the E-UTRA channel 1301 as shown in FIG. 13.

Meanwhile, 3GPP release 10 defines basic requirements that are the minimum values beyond which the respective frequency ranges should not go. This is as shown in the following table.

First, a neighboring channel power leakage ratio for E-UTRA band, i.e., $E\text{-}UTRA_{ACLR}$, is as shown in the following table.

TABLE 6

| | Channel band/E-UTRA$_{ACLR1}$/measurement band | | | | | |
|---|---|---|---|---|---|---|
| | 1.4 MHz | 3.0 MHz | 5 MHz | 10 MHz | 15 MHz | 20 MHz |
| E-UTRA$_{ACLR1}$ | 30 dB | 30 dB | 30 dB | 30 dB | 30 dB | 30 dB |
| E-UTRA channel measurement band | 1.08 MHz | 2.7 MHz | 4.5 MHz | 9.0 MHz | 13.5 MHz | 18 MHz |
| neighboring channel center frequency offset [MHz] | +1.4/−1.4 | +3.0/−3.0 | +5/−5 | +10/−10 | +15/−15 | +20/−20 |

Next, the neighboring channel power leakage ratio for UTRA band, i.e., UTRA$_{ACLR}$ is as shown in the following table 7.

TABLE 7

| | Channel (measurement band) | | | | | |
|---|---|---|---|---|---|---|
| | 1.4 MHz | 3.0 MHz | 5 MHz | 10 MHz | 15 MHz | 20 MHz |
| UTRA$_{ACLR1}$ | 33 dB | 33 dB | 33 dB | 33 dB | 33 dB | 33 dB |
| Neighboring channel center frequency offset (MHz) | 0.7 + BW$_{UTRA}$/2 or −0.7 − BW$_{UTRA}$/2 | 1.5 + BW$_{UTRA}$/2 or −1.5 − BW$_{UTRA}$/2 | +2.5 + BW$_{UTRA}$/2 or −2.5 − BW$_{UTRA}$/2 | +5 + BW$_{UTRA}$/2 or −5 − BW$_{UTRA}$/2 | +7.5 + BW$_{UTRA}$/2 or −7.5 − BW$_{UTRA}$/2 | +10 + BW$_{UTRA}$/2 or −10 − BW$_{UTRA}$/2 |
| UTRA$_{ACLR2}$ | — | — | 36 dB | 36 dB | 36 dB | 36 dB |
| Neighboring channel center frequency offset (MHz) | — | — | +2.5 + 3*BW$_{UTRA}$/2 or −2.5 − 3*BW$_{UTRA}$/2 | +5 + 3*BW$_{UTRA}$/2 or −5 − 3*BW$_{UTRA}$/2 | +7.5 + 3*BW$_{UTRA}$/2 or −7.5 − 3*BW$_{UTRA}$/2 | +10 + 3*BW$_{UTRA}$/2 or −10 − 3*BW$_{UTRA}$/2 |
| E-UTRA channel measurement band | 1.08 MHz | 2.7 MHz | 4.5 MHz | 9.0 MHz | 13.5 MHz | 18 MHz |
| UTRA 5 MHz channel measurement band | 3.84 MHz | 3.84 MHz | 3.84 MHz | 3.84 MHz | 3.84 MHz | 3.84 MHz |
| UTRA 1.6 MHz channel measurement band | 1.28 MHz | 1.28 MHz | 1.28 MHz | 1.28 MHz | 1.28 MHz | 1.28 MHz |

In the above table, BW$_{UTRA}$ refers to a channel bandwidth for UTRA.

As described above, if transmission is performed in an assigned channel band, an unwanted emission occurs to neighboring channels. Accordingly, in the example illustrated in FIG. 11, the uplink that is transmitted from operator B's user equipment to the base station interferes with operator A's user equipment receiving band. Further, the downlink that is transmitted from operator A's base station to the user equipment interferes with operator B's base station receiving band.

Now, a transmit power control method according to an aspect of the present invention is described with reference to experimental results.

Figure 15:
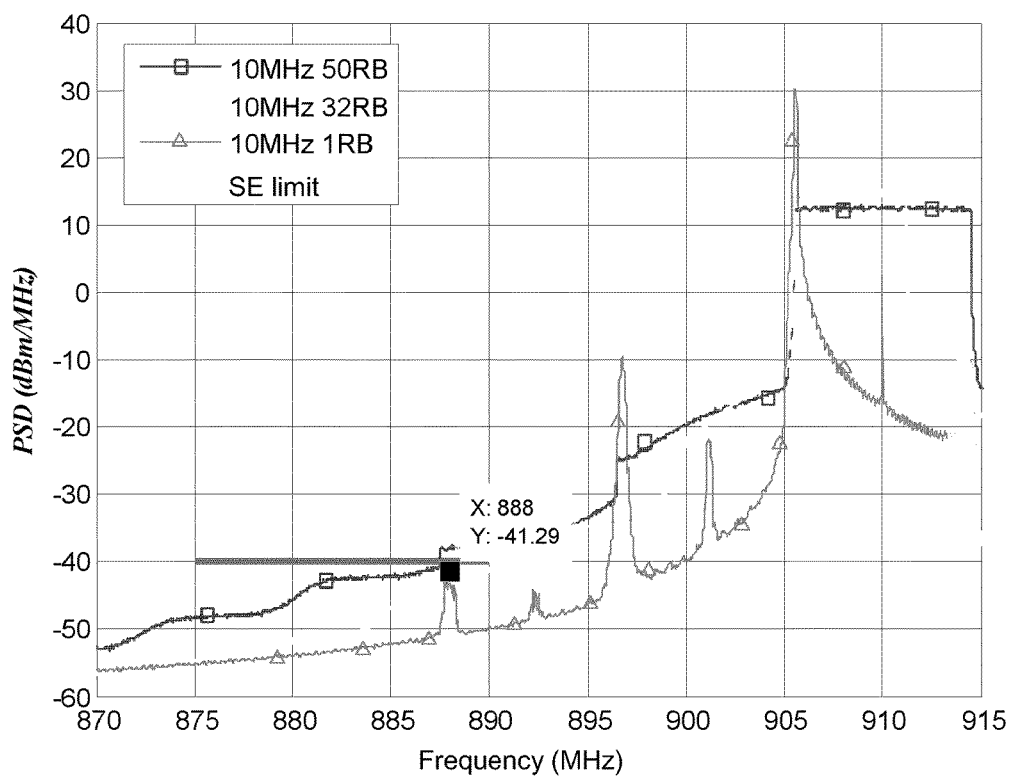
FIG. 15 illustrates an exemplary first experimental result for transmission resource block limitation.
Figure 16:
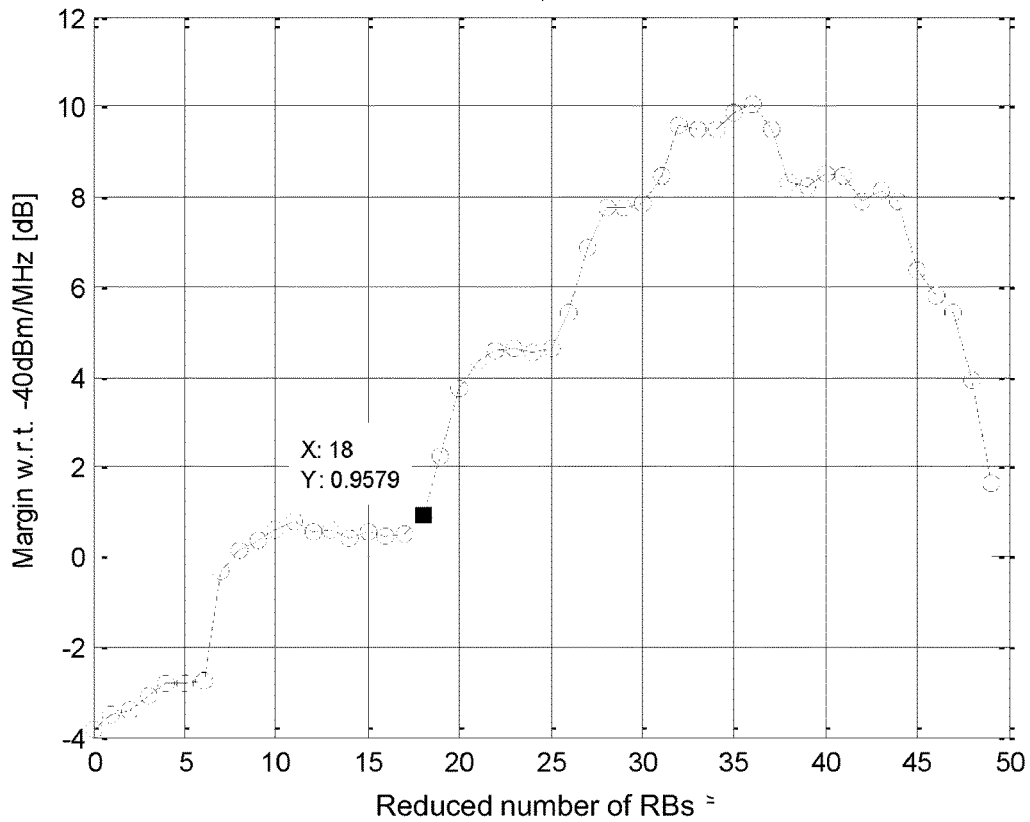
FIG. 16 illustrates the experimental result of FIG. 16 in another form.

FIG. 15 illustrates a first exemplary experimental result for transmission resource block constraint, and FIG. 16 represents the experimental result of FIG. 15 in a different form.

The RF experiment has been performed for 5 MHz (900 to 905 Mhz) and 10 MHz (905-915 MHz) channel bandwidths (CBWs) by performing single RB allocation, partial RB allocation, and entire RB allocation in order to observe a worst representative experimental result. By way of such experiment, a limitation on what number the RBs should be reduced to may be obtained.

The operating points of RF parts pre-defined for simulation are as follows:

modulator:
image rejection=−25 dBc
Carrier leakage)=−25 dBc
Counter IM3=−60 dBc
PA:
UTRA$_{ACLR1}$=33 dBc
UTRA$_{ACLR2}$=36 dBc (for allocation of all the RBs and 1 dB MPR)
duplex attenuation is not considered In this case, the unit "dBc" refers to a relative size with respect to the power of carrier frequency. Carrier leakage is of an additional sine waveform having the same frequency as the modulated wave carrier. Counter IM3 (intermodulation distortion) refers to an element that is incurred by a component such as a mixer or amplifier in an RF system.

The experiment primarily focuses on how much margin the spurious emission has with respect to a permitted reference spurious emission in the result of simulation. Here, the margin may be defined as a difference between a regulated requirement of −40 dBm/MHz and power spectrum density measured per MHz (dBm/MHz) in a sacrificed frequency range (i.e., 875 to 890 MHz).

If the margin has a minus value, this means that a limitation needs for RB allocation on uplink or that the transmit power needs to be reduced further to a predetermined transmit power reduction using additional MPR (hereinafter, "A-MPR") in addition to the basic MPR (hereinafter, "MPR").

Here, MPR refers to the amount of reduced power for the maximum transmit power defined with respect to a particular modulation order or the number of RBs (resource blocks) to meet the RF requirements defined in the standards (Spectrum Emission Mask (SEM), Adjacent Channel Leakage Ratio (ACLR), Spurious Emission (SE), etc.), and A-MPR refers to the amount of reduced power for the maximum transmit power defined, which occurs due to locational characteristics. That is, A-MPR means further reducing the maximum power of user equipment to a level so that the out-of-band spurious emission of user equipment transmission satisfies the requirements defined by a corresponding country.

Referring to FIG. 15, 10 MHz between 905 MHz and 915 MHz is assigned as a channel bandwidth, and it is shown how much PSD (Power Spectrum Density) and margin are obtained as the number of RBs is increased to one, 32, and 50.

Referring to the result of experiment as shown in FIG. 15, in case all the RBs, i.e., 50 RBs, are assigned to 10 MHz, PSD exceeds −40 dBm/MHz, so that a limitation on the RBs is required.

Meanwhile, referring to FIG. 16, when 10 MHz between 905 MHz and 915 MHz is assigned as a channel bandwidth, and the number of RBs to be limited from allocation upon user equipment transmission is sequentially increased from one, it is shown how much margin is obtained for the permitted spurious emission standard, −40 dBm/MHz. In FIG. 16, the number of RBs to be limited for the experiment has been increased from 0 (the number of RBs to be assigned is 50) to 49 (the number of RBs assigned is 1). In other words, the experiment sequentially limits additional RBs to the left starting from limiting the RB positioned rightmost in the channel bandwidth by 0. As such, since the RB limitation proceeds from right to left in the channel bandwidth (CBW), if the number of RBs to be limited is determined, allocation is performed so that a predetermined number of RBs are used from the left of the channel bandwidth (CBW).

Further, referring to FIG. 16, when eight RBs are limited, the margin starts to look like it is improved, and if a limitation is put to use only 32 RBs by limiting 18 RBs, the margin up to about 1 dB which may provide considerable room may be secured.

Figure 17:
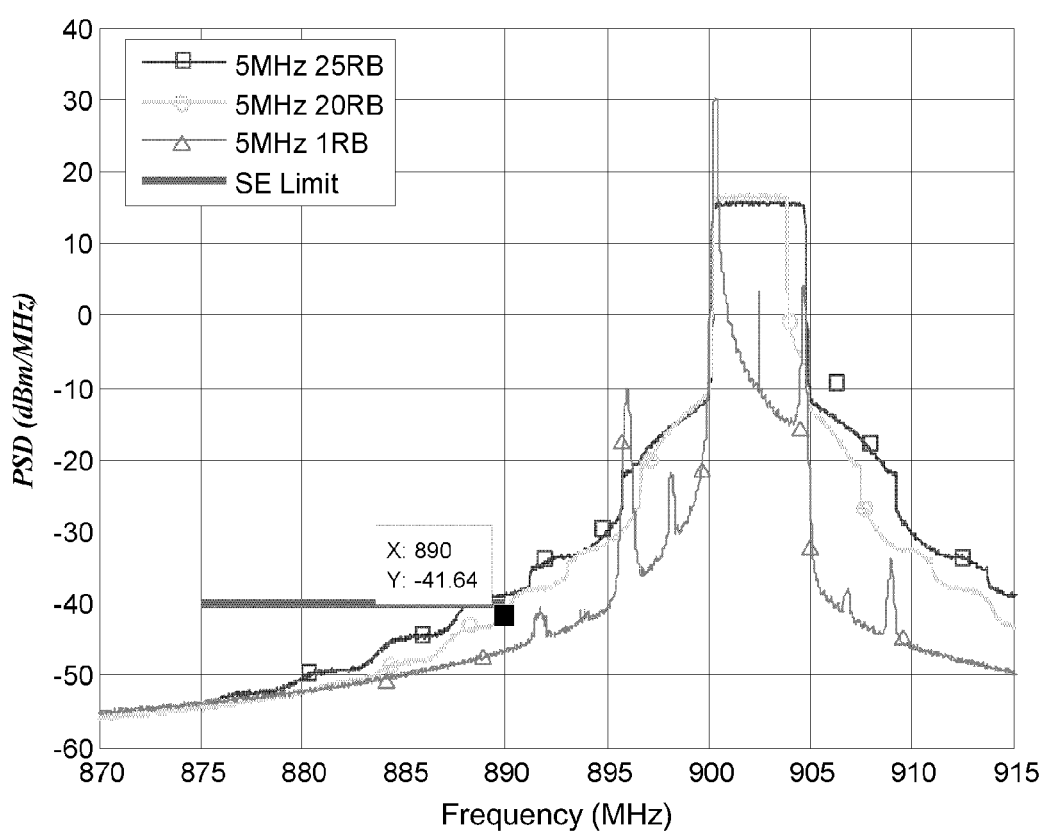
FIG. 17 illustrates an exemplary second experimental result for transmission resource block limitation.
Figure 18:
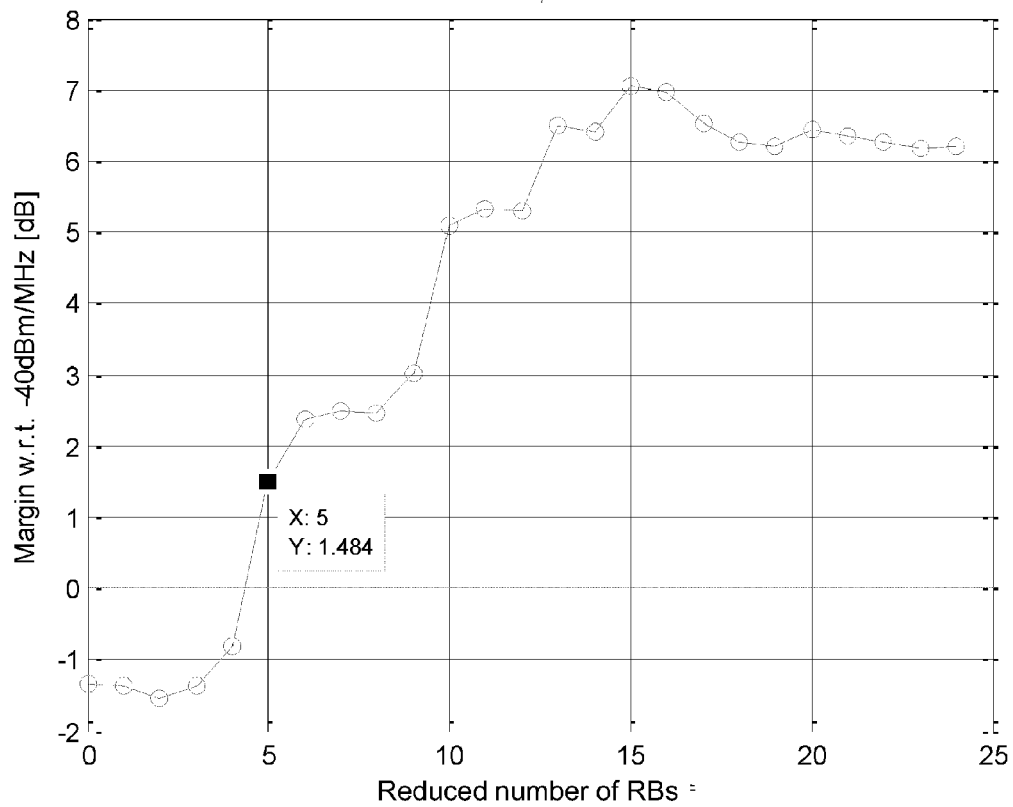
FIG. 18 illustrates the experimental result of FIG. 17 in another form.

FIG. 17 shows an exemplary second experimental result for transmit power control, and FIG. 18 shows the experimental result of FIG. 17 in a different form.

Referring to FIG. 17, when 5 MHz between 905 MHz and 905 MHz is assigned as the channel bandwidth, and the number of RBs assigned is increased to 1, 20, and 25, it is shown how much PSD (Power Spectrum Density) and how much margin corresponding to the PSD are obtained.

Referring to the experimental result shown in FIG. 17, in case all the RBs, i.e., 25 RBs, are assigned to 5 MHz, PSD exceeds −40 dBm/MHz, so that limitation on the RBs is needed.

Meanwhile, referring to FIG. 18, about five RBs need to be limited to meet the −40 dBM/MHz mask.

The experimental results shown above in FIGS. 15 to 18 are summarized as follows.

TABLE 8

| Channel bandwidth | RB allocation | (Margin) |
|---|---|---|
| 10 MHz | all RBs | −3.8 dB |
|  | 1 RB | 1.3 dB |
| 5 MHz | all RBs | −1.3 dB |
|  | 1 RB | 6.2 dB |

Table 8 above represents margins for all RB allocation and single RB allocation.

TABLE 9

| Channel bandwidth | RB limitation reduction | (Margin) |
|---|---|---|
| 10 MHz | 8 RBs | 0.1 dB |
|  | 18 RBs | 0.9 dB |
| 5 MHz | 5 RBs | 1.4 dB |

According to Table 9, it is shown that about 18 RBs and about 5 RBs need to be limited for the channel bandwidths ($BW_{Channel}$) 10 MHz and 5 MHz, respectively, in order to satisfy the permitted maximum spurious emission standard, −40 dBm/MHz.

In other words, although 50 RBs may be assigned in principle for 10 MHz as shown in Table 4, 18 RBs need to be limited, so that only up to 32 RBs may be assigned. Further, although 25 RBs may be assigned in principle for 5 MHz as shown in Table 4, 5 RBs should be limited, so that up to 20 RBs only may be assigned.

Meanwhile, Tables 8 and 9 above may be summarized as in the following equation.

$$N_{restricted\_RB} = N_{full\ RB\ of\ transmission\ bandwidth} - N_{RB\_limitation} \quad \text{[Equation 2]}$$

Here, $N_{restricted\_RB}$ refers to the number of RBs actually available, and $N_{full\ RB\ of\ transmission\ bandwidth}$ refers to the number of all of the RBs constituting the channel bandwidth. If the channel bandwidth is 10 MHz, the number of all the RBs of the transmission bandwidth is 50, and if the channel bandwidth is 5 MHz, the number of all the RBs of the transmission bandwidth is 25.

$N_{RB\_limitation}$ refers to the number of RBs that is subject to limitation.

The following table represents bands to be protected in each E-UTRA band and permitted spurious emission standards in the protected bands. Here, the lowest frequency at the measurement position in each frequency range for measurement conditions at the edge of each frequency range is set as a lowest edge of the frequency range+MBW/2. The highest frequency at the measurement position in each frequency range is set as the lowest edge of the frequency range−MBW/2. MBW means a measurement bandwidth for a band to be protected.

TABLE 10

Spurious emission

| E-UTRA band | Protected band | Frequency range (MHz) | Maximum level (dBm) | MBW (MHz) |
|---|---|---|---|---|
| 1 | E-UTRA band 1, 7, 8, 11, 20, 21, 22, 38, 40, 42, 43 | $F_{DL\_low}$-$F_{DL\_high}$ | −50 | 1 |
|  | E-UTRA band 3, 9, 34 | $F_{DL\_low}$-$F_{DL\_high}$ | −50 | 1 |
|  | E-UTRA band 33 | $F_{DL\_low}$-$F_{DL\_high}$ | −50 | 1 |
|  | E-UTRA band 39 | $F_{DL\_low}$-$F_{DL\_high}$ | −50 | 1 |
|  | frequency range | 860-895 | −50 | 1 |
|  | frequency range | 1884.5-1915.7 | −41 | 0.3 |
| 2 | E-UTRA band 4, 5, 10, 12, 13, 14, 17, 22, 23, 24, 41, 42 | $F_{DL\_low}$-$F_{DL\_high}$ | −50 | 1 |
|  | E-UTRA band 2, 25 | $F_{DL\_low}$-$F_{DL\_high}$ | −50 | 1 |
|  | E-UTRA band 43 | $F_{DL\_low}$-$F_{DL\_high}$ | −50 | 1 |
| 3 | E-UTRA band 1, 7, 8, 20, 33, 34, 38, 43 | $F_{DL\_low}$-$F_{DL\_high}$ | −50 | 1 |
|  | E-UTRA band 3 | $F_{DL\_low}$-$F_{DL\_high}$ | −50 | 1 |
|  | E-UTRA band 11, 21 | $F_{DL\_low}$-$F_{DL\_high}$ | −50 | 1 |
|  | E-UTRA band 22, 42 | $F_{DL\_low}$-$F_{DL\_high}$ | −50 | 1 |
|  | frequency range | 860-895 | −50 | 1 |
|  | frequency range | 1884.5-1915.7 | −41 | 0.3 |
| 4 | E-UTRA band 2, 4, 5, 10, 12, 13, 14, 17, 22, 23, 24, 25, 41, 43 | $F_{DL\_low}$-$F_{DL\_high}$ | −50 | 1 |
|  | E-UTRA band 42 | $F_{DL\_low}$-$F_{DL\_high}$ | −50 | 1 |
| 5 | E-UTRA band 2, 4, 5, 10, 12, 13, 14, 17, 22, 23, 24, 25, 42, 43 | $F_{DL\_low}$-$F_{DL\_high}$ | −50 | 1 |
|  | E-UTRA band 41 | $F_{DL\_low}$-$F_{DL\_high}$ | −50 | 1 |
| 6 | E-UTRA band 1, 9, 11, 34 | $F_{DL\_low}$-$F_{DL\_high}$ | −50 | 1 |
|  | frequency range | 860-875 | −37 | 1 |
|  | frequency range | 875-895 | −50 | 1 |
|  | frequency range | 1884.5-1919.6 1884.5-1915.7 | −41 | 0.3 |
| 7 | E-UTRA band 1, 3, 7, 8, 20, 22, 33, 34, 42, 43 | $F_{DL\_low}$-$F_{DL\_high}$ | −50 | 1 |
|  | frequency range | 2570-2575 | 1.6 | 5 |
|  | frequency range | 2575-2595 | −15.5 | 5 |
|  | frequency range |  | −40 | 1 |
| 8 | E-UTRA band 1, 20, 33, 34, 38, 39, 40 | $F_{DL\_low}$-$F_{DL\_high}$ | −50 | 1 |
|  | E-UTRA band 3 | $F_{DL\_low}$-$F_{DL\_high}$ | −50 | 1 |
|  | E-UTRA band 7 | $F_{DL\_low}$-$F_{DL\_high}$ | −50 | 1 |
|  | E-UTRA band 8 | $F_{DL\_low}$-$F_{DL\_high}$ | −50 | 1 |
|  | E-UTRA band 22, 42, 43 | $F_{DL\_low}$-$F_{DL\_high}$ | −50 | 1 |
|  | E-UTRA band 11, 21 | $F_{DL\_low}$-$F_{DL\_high}$ | −50 | 1 |
|  | frequency range | 860-890 | −40 | 1 |
|  | frequency range | 1884.5-1915.7 | −41 | 0.3 |
| 9 | E-UTRA band 1, 9, 11, 21, 34 | $F_{DL\_low}$-$F_{DL\_high}$ | −50 | 1 |
|  | frequency range | 860-895 | −50 | 1 |
|  | frequency range | 1884.5-1915.7 | −41 | 0.3 |
|  | frequency range | 945-960 | −50 | 1 |
| 10 | E-UTRA band 2, 4, 5, 10, 12, 13, 14, 17, 23, 24, 25, 41, 43 | $F_{DL\_low}$-$F_{DL\_high}$ | −50 | 1 |
|  | E-UTRA band 22, 42 | $F_{DL\_low}$-$F_{DL\_high}$ | −50 | 1 |
| 11 | E-UTRA band 1, 9, 11, 21, 34 | $F_{DL\_low}$-$F_{DL\_high}$ | −50 | 1 |
|  | frequency range | 860-895 | −50 | 1 |
|  | frequency range | 1884.5-1915.7 | −41 | 0.3 |
|  | frequency range | 945-960 | −50 | 1 |
| 12 | E-UTRA band 2, 5, 13, 14, 17, 23, 24, 25, 41 | $F_{DL\_low}$-$F_{DL\_high}$ | −50 | 1 |
|  | E-UTRA band 4, 10 | $F_{DL\_low}$-$F_{DL\_high}$ | −50 | 1 |
|  | E-UTRA band 12 | $F_{DL\_low}$-$F_{DL\_high}$ | −50 | 1 |
| 13 | E-UTRA band 2, 4, 5, 10, 12, 13, 17, 23, 25, 41 | $F_{DL\_low}$-$F_{DL\_high}$ | −50 | 1 |
|  | frequency range | 769-775 | −35 | 0.00625 |
|  | frequency range | 799-805 | −35 | 0.00625 |
|  | E-UTRA band 14 | $F_{DL\_low}$-$F_{DL\_high}$ | −50 | 1 |
|  | E-UTRA band 24 | $F_{DL\_low}$-$F_{DL\_high}$ | −50 | 1 |
| 14 | E-UTRA band 2, 4, 5, 10, 12, 13, 14, 17, 23, 24, 25, 41 | $F_{DL\_low}$-$F_{DL\_high}$ | −50 | 1 |
|  | frequency range | 769-775 | −35 | 0.00625 |
|  | frequency range | 799-805 | −35 | 0.00625 |
| 17 | E-UTRA band 2, 5, 13, 14, 17, 23, 24, 25, 41 | $F_{DL\_low}$-$F_{DL\_high}$ | −50 | 1 |
|  | E-UTRA band 4, 10 | $F_{DL\_low}$-$F_{DL\_high}$ | −50 | 1 |
|  | E-UTRA band 12 | $F_{DL\_low}$-$F_{DL\_high}$ | −50 | 1 |

TABLE 10-continued

Spurious emission

| E-UTRA band | Protected band | Frequency range (MHz) | Maximum level (dBm) | MBW (MHz) |
|---|---|---|---|---|
| 18 | E-UTRA band 1, 9, 11, 21, 34 | $F_{DL\_low}$-$F_{DL\_high}$ | −50 | 1 |
|  | frequency range | 860-895 | −40 | 1 |
|  | frequency range | 1884.5-1915.7 | −41 | 0.3 |
|  | frequency range | 945-960 | −50 | 1 |
| 19 | E-UTRA band 1, 9, 11, 21, 34 | $F_{DL\_low}$-$F_{DL\_high}$ | −50 | 1 |
|  | frequency range | 860-895 | −40 | 1 |
|  | frequency range | 1884.5-1915.7 | −41 | 0.3 |
|  | frequency range | 945-960 | −50 | 1 |
| 20 | E-UTRA band 1, 3, 7, 8, 20, 22, 33, 34, 43 | $F_{DL\_low}$-$F_{DL\_high}$ | −50 | 1 |
|  | E-UTRA band 20 | $F_{DL\_low}$-$F_{DL\_high}$ | −50 | 1 |
|  | E-UTRA band 38, 42 | $F_{DL\_low}$-$F_{DL\_high}$ | −50 | 1 |
| 21 | E-UTRA band 11 | $F_{DL\_low}$-$F_{DL\_high}$ | −35 | 1 |
|  | E-UTRA band 1, 9, 34 | $F_{DL\_low}$-$F_{DL\_high}$ | −50 | 1 |
|  | E-UTRA band 21 | $F_{DL\_low}$-$F_{DL\_high}$ | −50 | 1 |
|  | frequency range | 860-895 | −50 | 1 |
|  | frequency range | 1884.5-1915.7 | −41 | 0.3 |
|  | frequency range | 945-960 | −50 | 1 |
| 22 | E-UTRA band 1, 3, 7, 8, 20, 33, 34, 38, 39, 40, 43 | $F_{DL\_low}$-$F_{DL\_high}$ | −50 | 1 |
|  | frequency range | 3510-3525 | −40 | 1 |
|  | frequency range | 3525-3590 | −50 | 1 |
| 23 | E-UTRA band 4, 5, 10, 12, 13, 14, 17, 23, 24, 41 | $F_{DL\_low}$-$F_{DL\_high}$ | −50 | 1 |
|  | E-UTRA band 2 | $F_{DL\_low}$-$F_{DL\_high}$ | −50 | 1 |
|  | frequency range | 1998-1999 | −21 | 1 |
|  | frequency range | 1997-1998 | −27 | 1 |
|  | frequency range | 1996-1997 | −32 | 1 |
|  | frequency range | 1995-1996 | −37 | 1 |

Referring to E-UTRA band 8 in the above table, in case the frequency range in the protected band is 860 MHz to 890 MHz, the spurious emission should not exceed −40 dBm/MHz. To meet this, the uplink transmission band should be equal to or smaller than 20 RBs for the carrier having a 5 MHz channel band corresponding to 902.5 MHz≤center frequency ($F_c$)<907.5 MHz. For the carrier having a 10 MHz channel bandwidth whose center frequency ($F_c$) is 910 MHz, the uplink transmission band should be equal to or smaller than 32 RBs.

As can be seen from the above experimental results, if a service is intended to be offered to an operator in a 900 MHz band, all of the RBs in the channel bandwidth should not be used and the number of RBs to be assigned should be limited in order to provide such service without collision with other operator who is servicing in an adjacent band.

Thus, the base station should not assign all the RBs by limiting a few RBs in the channel bandwidth when assigning an uplink channel to the user equipment.

It has been described thus far how many RBs for configuring a channel bandwidth should be limited in order to reduce spurious emission in the 5 MHz (900 to 905 MHz) and 10 MHz (905 to 915 MHz) channel bandwidths. Hereinafter, an operation is described.

FIG. 19 illustrates a process of delivering system information.

Referring to FIG. 19(a), an example is shown in which operator A and operator B simultaneously provide services in a particular region. In this case, it is assumed that operator A is assigned 830 MHz to 845 MHz for uplink of operating band 19 and 875 MHz to 890 MHz for downlink, and operator B is assigned 900 MHz to 915 MHz which is a portion of the uplink of operating band 8 and 945 MHz to 960 MHz which is a portion of the downlink.

Under such circumstance, as shown in FIG. 19(b), the base station of operator B transmits master information block (MIB) and system information block (SIB).

The system information block (SIB) may contain one or more of information on the operating band that he is using among the operating bands shown in Table 1, information on the uplink (UL) bandwidth, and information on the uplink (UL) carrier frequency. The information on the uplink (UL) bandwidth may contain information on the number of resource blocks (RBs).

Accordingly, if the operating band is E-UTRA band 8 as shown in Table 1, the spurious emission in the 860 to 890 MHz band should not exceed −40 dBm/MHz in order to minimize the spurious emission to an adjacent 860 MHz to 890 Mhz band as can be seen with reference to Table 10. In order the permitted spurious emission value to be not in excess of −40 dBm/MHz, in case the user equipment performs transmission with the maximum transmit power, the uplink transmission band should be equal to or smaller than 20 RBs for a carrier having a 5 MHz channel band corresponding to 902.5 MHz≤center frequency ($F_c$)<907.5 MHz. That is, in case the channel bandwidth is 5 MHz, 25 RBs may be assigned in principle, but there may be a maximum of 20 RBs obtained by minimally limiting about 5 RBs. Further, in order for the permitted spurious emission value not to exceed −40 dBm/MHz, in case the user equipment performs transmission with the maximum transmit power for a carrier having a 10 MHz channel bandwidth whose center frequency ($F_c$) is 910 MHz, the uplink transmission band should be equal to or smaller than 32 RBs. In other words, as described above, 50 RBs may be assigned in principle in case the channel bandwidth is 10 MHz, but there may be a maximum of 32 RBs obtained by limiting a minimum of 18 RBs.

Referring to FIG. 19(c), a sub-frame where the MIB, SIB, and SI is transmitted is shown as an example. The MIB and the SIB are transmitted at the periods of 40 ms and 80 ms, respectively. The SI messages are transmitted as scheduled at different periods, respectively. In FIG. 19(c), the MIB, SIB, and SIs are all transmitted over a radio frame whose SFN (System Frame Number) is 0, as an example.

FIG. 20 shows a process of transmitting uplink data from a user equipment.

FIG. 20(a) is a flowchart illustrating a random access procedure in 3GPP LTE. The random access procedure is used for a user equipment to be assigned an uplink radio resource. An RRC connection is initialized through the random access procedure.

First, the user equipment receives a root index and a PRACH (physical random access channel) configuration index from the base station prior to performing the random access procedure. There are 64 candidate random access preambles defined by a ZC (Zadoff-Chu) sequence for each cell, and the root index is a logical index for the user equipment to generate the 64 candidate random access preambles.

The transmission of random access preambles is restricted to a particular time and frequency resource for each cell. The PRACH configuration index indicates a particular sub-frame and preamble format where a random access preamble may be transmitted.

The user equipment transmits a random access preamble arbitrarily selected to the base station (S2010). The user equipment selects one of the 64 candidate random access preambles. The user equipment selects a corresponding sub-frame by the PRACH configuration index. The user equipment transmits the selected random access preamble through the selected sub-frame.

Upon reception of the random access preamble, the base station sends a random access response (RAR) to the user equipment (S2020). The random access response is detected in two steps. First, the user equipment detects a PDCCH masked with an RA-RNTI (random access-RNTI), and the user equipment receives the random access response in the MAC (Medium Access Control) PDU (Protocol Data Unit) over the PDSCH indicated by the DL grant on the detected PDCCH.

FIG. 20(b) shows an example random access response.

The random access response may include a TAC (Timing Advance Command), a UL grant, and a temporary C-RNTI.

The TAC is information indicating a time alignment value that is sent from the base station to the user equipment for maintaining UL time alignment. The user equipment renews the UL transmission timing using the time alignment value. If the user equipment renews the time alignment, a time alignment timer is initiated or restarted. The user equipment may perform UL transmission only when the time alignment timer is in operation.

The UL grant is a UL resource used for transmission of a scheduling message.

Referring back to FIG. 20(a), the user equipment transmits a message scheduled as per the UL grant in the random access response to the base station (S2030). In this case, if the uplink operating band in which the scheduling message to be transmitted by the user equipment is sent is E-UTRA band 8 in Table 1 above, the user equipment's spurious emission in 860 MHz to 890 MHz should not exceed −40 dBm/MHz in order to minimize the spurious emission to the adjacent 860 MHz to 890 MHz band as can be seen in reference to Table 10. As such, in order for transmission to be performed without the spurious emission exceeding −40 dBm/MHz, in case the user equipment performs transmission with the maximum transmit power, the uplink transmission band should be equal to or smaller than 20 RBs for a carrier having a 5 MHz channel band corresponding to 902.5 MHz≤center frequency ($F_c$)<907.5 MHz. That is, in case the channel bandwidth is 5 MHz, 25 RBs may be assigned in principle, but there may be a maximum of 20 RBs obtained by limiting a minimum of about 5 RBs. Further, in order for the spurious emission not to exceed −40 dBm/MHz in 860 MHz to 890 MHz, in case the user equipment performs transmission with the maximum transmit power, the uplink transmission band should be equal to or smaller than 32 RBs for a carrier having a 10 MHz channel bandwidth whose frequency carrier ($F_c$) is 910 MHz. That is, although 50 RBs may be assigned in principle in case the channel bandwidth is 10 MHz as described above, there may be a maximum of 32 RBs obtained by limiting a minimum of about 18 RBs.

The embodiments of the present invention may be implemented by various means. For example, the embodiments of the present invention may be implemented in hardware, firmware, software or a combination thereof.

When implemented in hardware, the methods according to the embodiments of the present invention may be embedded in one or more of ASICs (application specific integrated circuits), DSPs (digital signal processors), DSPDs (digital signal processing devices), PLDs (programmable logic devices), FPGAs (field programmable gate arrays), processors, controllers, microcontrollers, and microprocessors.

When implemented in firmware or software, the methods according to the embodiments of the present invention may be implemented in the form of modules, procedures, or functions that perform the above-described functions or operations. The software codes may be stored in the memory units and may be driven by the processors. The memory units may be positioned inside or outside the processors and may communicate data with the processors by various known means.

Figure 21:
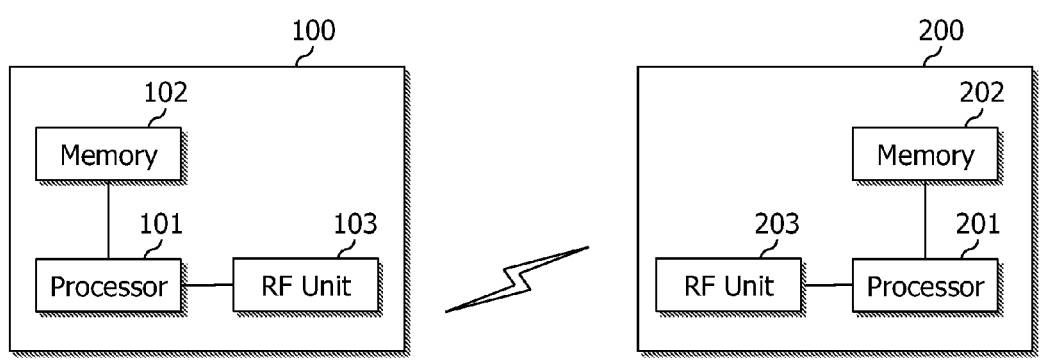
FIG. 21 is a block diagram illustrating a wireless communication system in which an embodiment of the present invention is implemented.

FIG. 21 is a block diagram illustrating a wireless communication system where an embodiment of the present invention is implemented.

The base station 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

What is claimed is:

1. A wireless apparatus for transmitting an uplink signal in a wireless communication system, the wireless apparatus comprising:
a Radio Frequency (RF) unit configured to receive a system information block (SIB) and transmit the uplink signal,
wherein the SIB includes information specifying a predetermined channel bandwidth and information specifying, as an operating band, an evolved universal terrestrial radio access (E-UTRA) band 8; and
a processor configured to configure the RF unit to use the predetermined channel bandwidth and use the E-UTRA band 8 based on the SIB,
wherein, if the RF unit is configured to use the predetermined channel bandwidth and if the RF unit is configured to use the band 8 and is required to meet a predetermined maximum level of a spurious emission to protect another frequency range, the uplink signal is transmitted by using a specific number of resource blocks (RBs) calculated by subtracting a predetermined number of RBs from a total number of RBs corresponding to the predetermined channel bandwidth,
wherein, if the predetermined channel bandwidth is 5 MHz, the predetermined number of RBs is 5, and
wherein, if the predetermined channel bandwidth is 10 MHz, the predetermined number of RBs is 18.

2. The wireless apparatus of claim 1, wherein the maximum level of spurious emission is −40 dBm/MHz.

3. The wireless apparatus of claim 1, wherein
if the predetermined channel bandwidth is 5 MHz, the total number of RBs is 25; and
if the predetermined channel bandwidth is 10 MHz, the total number of RBs is 50.

4. The wireless apparatus of claim 1, wherein
if the predetermined channel bandwidth is 5 MHz, the specific number of RB is fewer than or equal to 20 which is calculated by subtracting 5 of the predetermined number of RBs from 25 of the total number of RBs; and
if the predetermined channel bandwidth is 10 MHz, the specific number of RB is fewer than or equal to 32 which is calculated by subtracting 18 of the predetermined number of RBs from 50 of the total number of RBs.

5. The wireless apparatus of claim 1, wherein
if the predetermined channel bandwidth is 5 MHz, the specific number of RB is fewer than or equal to 20,
if the predetermined channel bandwidth is 10 MHz, the specific number of RB is fewer than or equal to 32.

6. The wireless apparatus of claim 1, wherein the E-UTRA band 8 is defined as 880 MHz through 915 MHz for uplink and as 925 MHz through 960 MHz for downlink.

7. The wireless apparatus of claim 1, wherein when the specific number of the RBs is represented as Nrestricted_RB, Nrestricted_RB=Nfull RB of transmission bandwidth−NRB_limitation, wherein Nfull RB of transmission bandwidth is the total number of RBs of a transmission bandwidth constituting a channel bandwidth, and NRB_limitation is the predetermined number of RBs to satisfy the predetermined maximum level of the spurious emission.

8. A base station receiving an uplink signal in a wireless communication system, the base station comprising:
an RF (Radio Frequency) unit configured to transmit a system information block (SIB) and receive the uplink signal; and
a processor connected with the RF unit and controlling the RF unit,
wherein the SIB includes information specifying a predetermined channel bandwidth and information specifying, as an operating band, an evolved universal terrestrial radio access (E-UTRA) band 8,
wherein, if the RF unit is configured to use the predetermined channel bandwidth and if the RF unit is configured to use the E-UTRA band 8 and is required to meet a predetermined maximum level of a spurious emission to protect another frequency range, the processor assigns an uplink resource including a specific number of resource blocks (RBs) instead of a total number of calculated by subtracting a predetermined number of RBs from a total number of RBs corresponding to the predetermined channel bandwidth,
wherein, if the predetermined channel bandwidth is 5 MHz, the predetermined number of RBs is 5, and
wherein, if the predetermined channel bandwidth is 10 MHz, the predetermined number of RBs is 18.

9. The base station of claim 8, wherein
if the predetermined channel bandwidth is 5 MHz, the total number of RBs is 25; and
if the predetermined channel bandwidth is 10 MHz, the total number of RBs is 50.

10. The base station of claim 9, wherein
if the specific channel bandwidth is 5 MHz, the predetermined number of RB is fewer than or equal to 20 which is calculated by subtracting 5 of the predetermined number of RBs from 25 of the total number of RBs; and
if the predetermined channel bandwidth is 10 MHz, the specific number of RB is fewer than or equal to 32 which is calculated by subtracting 18 of the predetermined number of RBs from 50 of the total number of RBs.

11. The base station of claim 8, wherein
if the predetermined channel bandwidth is 5 MHz, the specific number of RB is fewer than or equal to 20,
if the predetermined channel bandwidth is 10 MHz, the specific number of RB is fewer than or equal to 32.

* * * * *